(12) United States Patent
Kaneko et al.

(10) Patent No.: US 7,500,468 B2
(45) Date of Patent: Mar. 10, 2009

(54) DEVICE AND METHOD FOR DETERMINING KNOCKING OF INTERNAL COMBUSTION ENGINE

(75) Inventors: Rihito Kaneko, Nishikamo-gun (JP);
Kenji Kasashima, Nishikamo-gun (JP);
Masatomo Yoshihara, Toyota (JP);
Kenji Senda, Okazaki (JP); Yuuichi Takemura, Anjo (JP); Shuhei Oe, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 31 days.

(21) Appl. No.: 11/767,738

(22) Filed: Jun. 25, 2007

(65) Prior Publication Data
US 2008/0000448 A1    Jan. 3, 2008

(30) Foreign Application Priority Data
Jun. 28, 2006    (JP) .............................. 2006-178301

(51) Int. Cl.
*F02P 5/00*    (2006.01)
(52) U.S. Cl. ............................ 123/406.29; 123/406.34; 123/406.38
(58) Field of Classification Search ............ 123/406.29, 123/406.37–39, 406.34–35, 406.32, 406.5, 123/406.16, 406.21, 406.24; 701/111, 102; 73/114.07, 114.03, 114.04, 111.11, 35.01
See application file for complete search history.

(56) References Cited

U.S. PATENT DOCUMENTS

| | | | | |
|---|---|---|---|---|
| 4,993,387 A | * | 2/1991 | Sakakibara et al. ..... | 123/406.33 |
| 5,083,278 A | * | 1/1992 | Matsuura ................... | 701/111 |
| 5,134,980 A | * | 8/1992 | Sakakibara et al. .... | 123/406.38 |
| 5,467,638 A | * | 11/1995 | Philipp ..................... | 73/35.06 |
| 7,251,556 B2 | * | 7/2007 | Kaneko et al. ............. | 701/111 |
| 7,392,788 B2 | * | 7/2008 | Kaneko et al. ........ | 123/406.29 |
| 2005/0251320 A1 | * | 11/2005 | Kasashima et al. ......... | 701/111 |
| 2006/0136117 A1 | * | 6/2006 | Kaneko et al. ............ | 701/111 |
| 2006/0288982 A1 | * | 12/2006 | Kaneko et al. ........ | 123/406.39 |

FOREIGN PATENT DOCUMENTS

| JP | 1-209326 | 8/1989 |
|---|---|---|
| JP | 4-76249 | 3/1992 |
| JP | 11-270400 | 10/1999 |
| JP | 2003-21032 | 1/2003 |
| JP | 2004-353531 | 12/2004 |
| JP | 2005-23902 | 1/2005 |
| JP | 2005-330954 | 12/2005 |
| JP | 2006-177319 | 7/2006 |

* cited by examiner

*Primary Examiner*—Stephen K Cronin
*Assistant Examiner*—Hung Q Nguyen
(74) *Attorney, Agent, or Firm*—Oblon, Spivak, McClelland, Maier & Neustadt, P.C.

(57) ABSTRACT

An engine ECU executes a program including the steps of: determining that the condition that there is a possibility of occurrence of knocking is satisfied, based on the result of comparison between a vibration waveform of an engine and a knock waveform model; calculating a 40CA integrated value by integrating magnitudes of vibration occurring in the engine for a range of crank angle of 40°; calculating a knock magnitude N by dividing the 40CA integrated value by a BGL; determining that knocking has occurred when the knock magnitude N is larger than a determination value V(KX); and determining that knocking has not occurred when the knock magnitude N is smaller than the determination value V(KX).

30 Claims, 22 Drawing Sheets

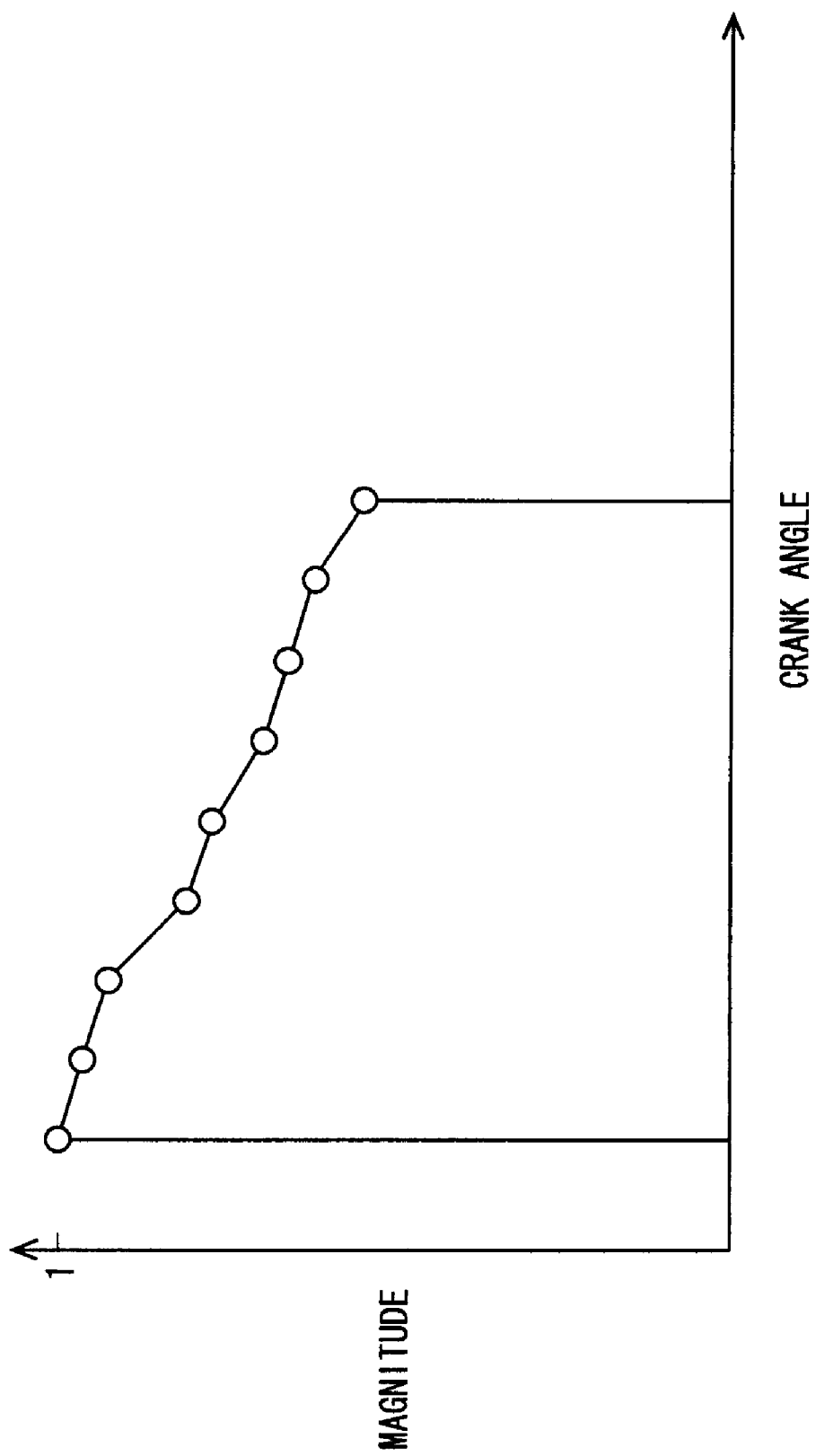
F I G. 5

FIG. 9

| | | |
|---|---|---|
| A | C | B |
| B | C | B |
| A | B | A |

INTAKE AIR AMOUNT KL

KL(2)
KL(1)

NE(1)  NE(2)
ENGINE SPEED NE

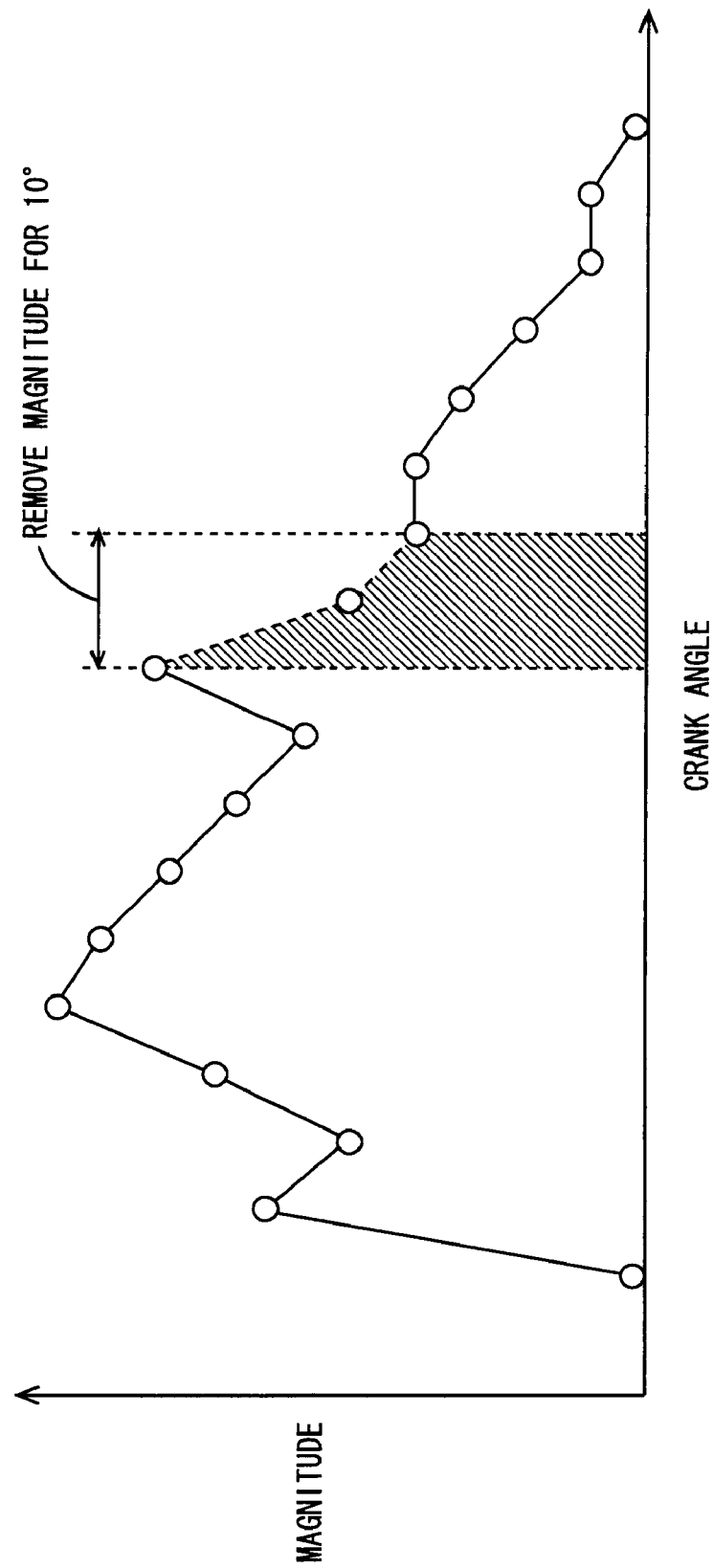
F I G. 19 even as to an output signal, which has been erroneously
DEVICE AND METHOD FOR DETERMINING KNOCKING OF INTERNAL COMBUSTION ENGINE This nonprovisional application is based on Japanese Patent Application No. 2006-178301 filed with the Japan Patent Office on Jun. 28, 2006, the entire contents of which are hereby incorporated by reference.

BACKGROUND OF THE INVENTION

1. Field of the Invention

The present invention relates to a device and a method for determining knocking of an internal combustion engine, and particularly to a technique of determining whether knocking has occurred or not based on a waveform of vibration of the internal combustion engine.

2. Description of the Background Art

Various methods have been proposed for determining whether knocking (knock) has occurred or not. Whether knocking has occurred or not is determined, for example, by detecting the magnitude of vibration generated in an internal combustion engine and comparing the magnitude with a threshold value. Meanwhile, in the internal combustion engine, besides vibration due to knocking, vibration could occur when an intake valve or an exhaust valve sits on its seat. Vibration could also occur due to the actuation of an injector (in particular, an in-cylinder direct injector that directly injects fuel into a cylinder) or a high-pressure pump that supplies fuel to the injector. When such vibration due to these factors is detected as noise together with vibration due to knocking, the magnitude of vibration may not be effective at distinguishing vibration due to knocking from the vibration due to noise. Accordingly, a technique has been proposed of determining whether knocking has occurred or not in consideration of both of the magnitude of vibration and the shape of waveform thereof.

Japanese Patent Laying-Open No. 2003-021032 discloses a knock control device for an internal combustion engine using a statistical processing program determining that knocking has occurred upon detecting an output value larger than a knock determination value corrected by statistical processing as well as a waveform shape program using the waveform of vibration for determining whether knocking has occurred or not. The knock control device for an internal combustion engine disclosed in Japanese Patent Laying-Open No. 2003-021032 includes: a knock sensor detecting knocking in the internal combustion engine; a statistical processing portion statistically processing a signal detected by the knock sensor and input through a low-pass filter and a high-pass filter; a first temporal determination portion determining occurrence of knocking based on a processing result by the statistical processing portion; a second temporal determination portion determining occurrence of knocking based on a waveform shape of the output signal detected by the knock sensor; and a final knock determination portion finally determining occurrence of knocking based on the knock temporal determination of the first temporal determination portion and the knock temporal determination of the second temporal determination portion. When both of the first and second temporal determination portions determine that knocking has occurred, the final knock determination portion finally determines that knocking has occurred. The first temporal determination portion makes a comparison between the maximum value of the output signal detected by the knock sensor and a knock determination value calculated based on the result of processing by the statistical processing portion to determine whether or not knocking has occurred.

According to the knock control device disclosed in the publication, a knock temporal determination by the statistical processing program and a knock temporal determination by the waveform shape program are used, and only when both of the temporal determinations determine that knocking has occurred, it is finally determined that knocking has occurred. As a result, occurrence of knocking can precisely be determined even as to an output signal, which has been erroneously determined by a knock determination employing solely the statistical processing program or the waveform shape program.

The detected vibration of the internal combustion engine includes vibration generated when the intake valve or exhaust valve closes and vibration due to actuation of an injector (in particular, in-cylinder injector for directly injecting fuel into a cylinder) or a fuel pump supplying fuel to the injector, namely includes vibration of the noise component. The magnitude of such vibration is large to the degree that corresponds to the magnitude of vibration generated due to knocking. Therefore, in the case where whether or not knocking has occurred is determined using a maximum value of the output signal detected by the knock sensor as done by the knock control device disclosed in Japanese Patent Laying-Open No. 2003-021032, it could erroneously be determined that knocking has occurred despite the fact that knocking has not actually occurred.

SUMMARY OF THE INVENTION

An object of the present invention is to provide a device and the like for determining knocking of an internal combustion engine, capable of precisely determining whether or not knocking has occurred.

According to an aspect of the present invention, a device for determining knocking of an internal combustion engine includes a crank position sensor detecting a crank angle of the internal combustion engine, a knock sensor detecting a magnitude of vibration of the internal combustion engine in association with the crank angle, and an operation unit. The operation unit detects a waveform of vibration in a first interval from a first crank angle to a second crank angle, based on the magnitude of vibration of the internal combustion engine, determines whether or not a predetermined condition is satisfied, based on a result of comparison between the detected waveform and a waveform model predetermined for use as a reference waveform of vibration in a second interval of at most the first interval, calculates an integrated value by integrating magnitudes that are included in the detected waveform and that are in a third interval of at most the first interval, based on whether or not the condition is satisfied, and determines whether or not knocking has occurred in the internal combustion engine, based on the integrated value.

Regarding this configuration, the crank position sensor detects the crank angle of the internal combustion engine. The knock sensor detects the magnitude of vibration of the internal combustion engine in association with the crank angle. Based on the magnitude, the waveform of vibration in the first interval from the first crank angle to the second crank is detected. Based on the result of comparison between this waveform and the waveform model predetermined as a reference waveform of vibration in the second interval which is at most the first interval, whether or not a predetermined condition is satisfied is determined. For example, it is determined whether or not the condition that there is a possibility of occurrence of knocking is satisfied. Based on the result of this determination, the integrated value is calculated by integrating magnitudes that are included in the detected waveform and that are in the third interval of at most the first interval. For example, when the condition is satisfied, the integrated value is calculated. When the condition is not satisfied, the waveform is corrected and then the integrated value is calculated. It is noted that the vibration has such characteristics that the vibration due to knocking attenuates gradually while the vibration due to the noise component attenuates rapidly. Therefore, the difference between the integrated value of the magnitudes of vibration due to knocking and the integrated value of the magnitudes of vibration due to the noise component is likely to large. Thus, based on the integrated value, whether or not knocking has occurred in the internal combustion engine is determined. In this way, the vibration due to knocking can be distinguished accurately from the vibration due to the noise component. Accordingly, the frequency can be reduced at which it is erroneously determined that knocking has occurred, despite the fact that knocking has not occurred actually. Thus, the device for determining knocking of the internal combustion engine can be provided that can accurately determine whether or not knocking has occurred.

Preferably, the operation unit calculates the integrated value when it is determined that the condition is satisfied.

Regarding this configuration, the integrated value is calculated when it is determined that the condition is satisfied. For example, when it is determined that the condition that there is a possibility of occurrence of knocking is satisfied, the integrated value is calculated. Thus, only when there is a possibility of occurrence of knocking, the integrated value is calculated to determine whether knocking has actually occurred or not. Accordingly, the accuracy with which the determination is made as to whether knocking has occurred or not can be further improved.

More preferably, the second interval is smaller than the first interval. The operation unit determines whether or not the condition is satisfied for each of regions respectively from a predetermined number of selected crank angles at which magnitudes are largest among magnitudes each larger than respective magnitudes at adjacent crank angles, based on the result of comparison between the detected waveform and the waveform model. When it is determined that any of the regions does not satisfy the condition, the operation unit corrects the detected waveform so that the magnitude at any crank angle in the region that does not satisfy the condition as determined is reduced and calculates the integrated value, and then corrects the integrated value to increase the integrated value.

Regarding this configuration, the second interval of crank angle in which the waveform model is defined is an interval smaller than the first interval in which the waveform of vibration is detected. The waveform of vibration detected in the first interval from the first crank angle to the second crank angle includes, even when knocking has occurred, the vibration due to the noise component mixed therein in addition to the vibration due to knocking. The magnitude of vibration due to knocking and the magnitude of vibration due to the noise component are both large. Then, in regions respectively from a predetermined number of selected crank angles at which the magnitudes are the largest ones among magnitudes each larger than respective magnitudes at adjacent crank angles, the detected waveform and the waveform model are compared with each other. Based on the result of this comparison, whether or not the condition is satisfied is determined for each of the regions. For example, whether or not the condition that there is a possibility of occurrence of knocking is satisfied is determined for each region. When it is determined that any of the regions does not satisfy the condition, the detected waveform is corrected so that the magnitude at any crank angle in the region that does not satisfy the condition as determined is reduced, and then the integrated value is calculated. In this way, it can be suppressed that the integrated value is excessively larger by the magnitude considered as the magnitude of vibration due to the noise component. However, if the detected waveform is corrected, the integrated value calculated by integrating magnitudes of the waveform in the third interval could be excessively smaller as compared with the integrated value calculated in the case where the waveform is not corrected. In this case, it could erroneously be determined that knocking has not occurred despite the fact that the vibration due to knocking has actually detected. Then, the integrated value is corrected to be increased. Thus, while influences of vibration due to the noise component are removed from the integrated value, it can be suppressed that the integrated value becomes smaller than required. Therefore, the frequency can be reduced at which it is erroneously determined that knocking has occurred despite the fact that knocking has not occurred actually or at which it is erroneously determined that knocking has not occurred despite the fact that knocking has actually occurred.

Still preferably, the operation unit determines whether or not knocking has occurred in the internal combustion engine, based on the integrated value determined by integrating magnitudes in the third interval that are at crank angles including any crank angle in the region that satisfies the condition as determined.

Regarding this configuration, whether or not knocking has occurred in the internal combustion engine is determined based on the integrated value calculated by integrating magnitudes in the third interval that are at angles including any crank angle in the region satisfying the condition as determined. Thus, based on the integrated value calculated in consideration of the magnitude which may possibly be the magnitude of vibration due to knocking, whether or not knocking has occurred can be determined.

Still preferably, the operation unit determines whether or not knocking has occurred in the internal combustion engine, based on the integrated value determined by integrating magnitudes in the third interval from a third crank angle to a fourth crank angle.

Regarding this configuration, the integrated value can be obtained that is calculated by integrating magnitudes in a range of crank angle that is always the same.

Still preferably, the first crank angle and the third crank angle are the same crank angle, and the second crank angle and the fourth crank angle are the same crank angle.

Regarding this configuration, the integrated value can be obtained that is calculated by integrating magnitudes in the same range of crank angle as that in which the waveform of vibration in the internal combustion engine is detected.

Still preferably, the second interval and the third interval are the same interval.

Regarding this configuration, the integrated value can be obtained that is calculated by integrating magnitudes in the same range of crank angle as that of the waveform model.

Still preferably, the condition is a condition that there is a possibility of occurrence of knocking.

Regarding this configuration, based on the result of comparison between the waveform of vibration in the internal combustion engine and the waveform model, it is determined whether or not the condition that there is a possibility of occurrence of knocking is satisfied. Thus, from the waveform of vibration, whether or not there is a possibility of occurrence of knocking can be determined.

Still preferably, the operation unit determines whether or not knocking has occurred in the internal combustion engine by comparing the integrated value with a predetermined determination value, and the operation unit corrects the determination value based on a plurality of the integrated values.

Regarding this configuration, the integrated value is compared with a predetermined determination value to determine whether or not knocking has occurred in the internal combustion engine. It is noted that characteristics of vibration occurring in the internal combustion engine could change regardless of whether knocking occurs or not, due to such factors as secular changes of the internal combustion engine and difference between products. Therefore, if the determination value is kept constant, the state does not always continue where whether or not knocking has occurred can be determined precisely. Therefore, based on a plurality of integrated values, the determination value is corrected. For example, based on integrated values in 200 ignition cycles, the determination value is corrected. Thus, according to vibration occurring actually in the internal combustion engine, the determination value can be corrected. Therefore, the state where knocking has occurred or not can be determined precisely can be maintained.

Still preferably, the operation unit calculates a frequency of occurrence of knocking based on a plurality of integrated values, and the operation unit corrects the determination value based on the frequency of occurrence of knocking.

Regarding this configuration, it is determined whether knocking has occurred or not that by comparing the integrated value with the determination value, and further the frequency of occurrence of knocking is calculated based on a plurality of integrated values. Based on the frequency of occurrence of knocking, the determination value is corrected. For example, when the frequency of occurrence of knocking is higher than a threshold value, the determination value is reduced so that it is more likely to be determined that knocking has occurred. On the contrary, when the frequency of occurrence of knocking is smaller than the threshold value, the determination value is increased so that it is more unlikely to be determined that knocking has occurred. In this way, a determination value appropriately determined according to the frequency of occurrence of knocking can be obtained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a knock waveform model stored in a ROM of the engine ECU.

FIG. 9 shows a map of a determination value V(KX) stored in the ROM of the engine ECU.

FIGS. 19 to 21 are (first to third) diagrams showing a crank angle removed from the vibration waveform according to the second embodiment of the present invention.

DESCRIPTION OF THE PREFERRED EMBODIMENTS

Figure 1:
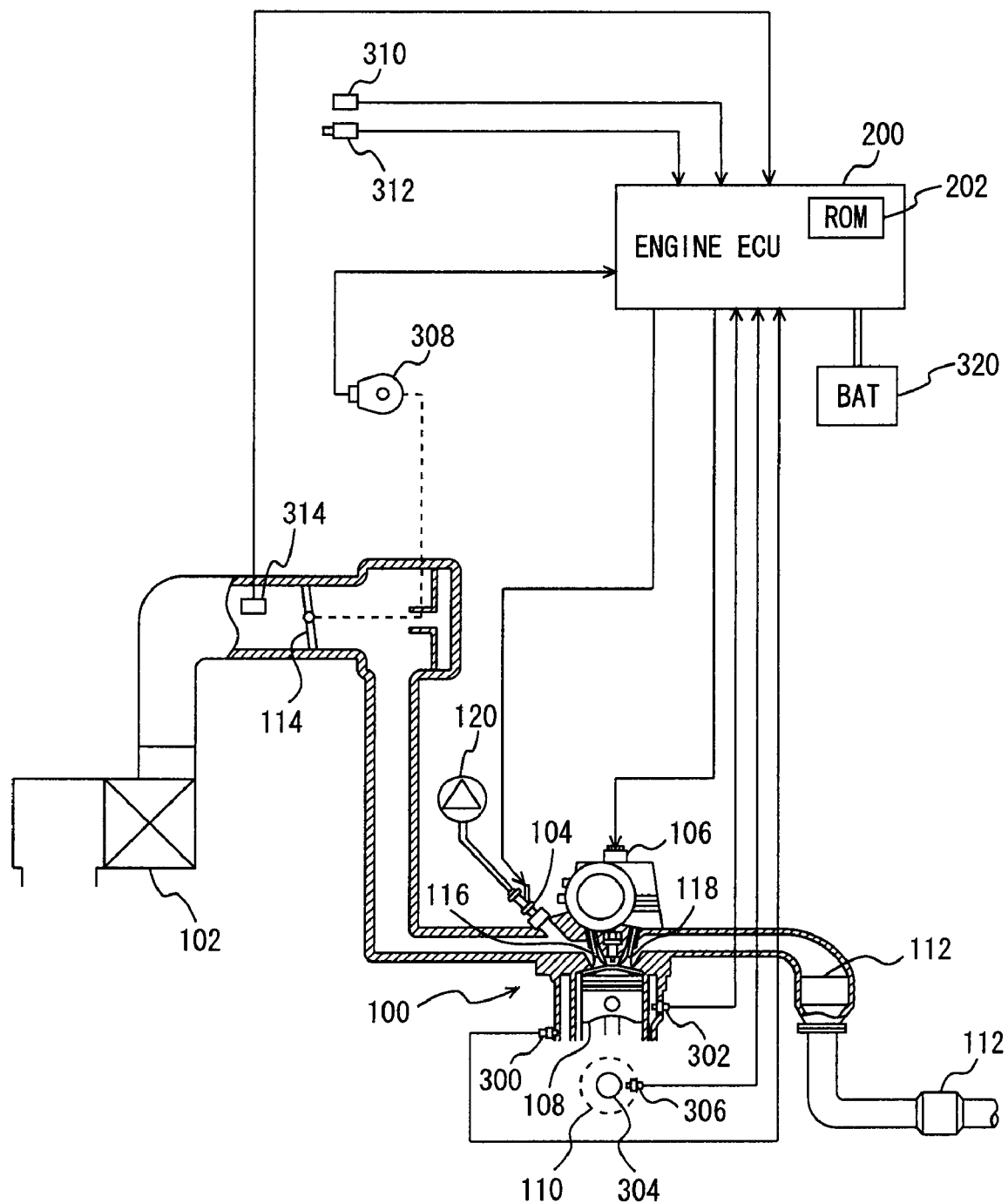
FIG. 1 is a schematic configuration diagram showing an engine controlled by an engine ECU that is a knocking determination device according to an embodiment of the present invention.

In the following, embodiments of the present invention will be described with reference to the drawings. In the following description, like components are denoted by like reference characters. They are named and function identically as well. Therefore, a detailed description thereof will not be repeated.

First Embodiment

With reference to FIG. 1, an engine 100 of a vehicle mounted with a knocking determination device according to a first embodiment of the invention will be described. Engine 100 is provided with a plurality of cylinders. The knocking determination device according to the embodiment is accomplished by a program executed by an engine ECU (Electronic Control Unit) 200 for example.

Engine 100 is an internal combustion engine in which an air-fuel mixture of air drawn in from an air cleaner 102 and fuel injected from an injector 104 is ignited by a spark plug 106 and burnt in a combustion chamber. While the ignition timing is controlled to be MBT (Minimum advance for Best Torque) at which output torque becomes the maximum, the ignition timing is retarded or advanced according to an operation state of engine 100, for example, when knocking occurs.

When the air-fuel mixture is burnt, a piston 108 is pushed down by the combustion pressure and a crankshaft 110 is rotated. The air-fuel mixture after combustion (exhaust gas) is cleaned by three-way catalysts 112 and thereafter exhausted to the outside of the vehicle. An amount of air drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a sensor 308 for an opening position of the throttle, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates a voltage in response to vibration of engine 100. The magnitude of the voltage corresponds to the magnitude of vibration. Knock sensor 300 sends a signal representing the voltage to engine ECU 200. Water temperature sensor 302 detects the temperature of a coolant in a water jacket of engine 100 and sends a signal representing the detection result to engine ECU 200.

Timing rotor 304 is provided to crankshaft 110 and rotates with crankshaft 110. On an outer periphery of timing rotor 304, a plurality of protrusions are provided at predetermined intervals. Crank position sensor 306 is provided to face the protrusions of timing rotor 304. When timing rotor 304 rotates, an air gap between the protrusion of timing rotor 304 and crank position sensor 306 changes and, as a result, magnetic flux passing through a coil portion of crank position sensor 306 increases/decreases to generate electromotive force in the coil portion. Crank position sensor 306 sends a signal representing the electromotive force to engine ECU 200. Engine ECU 200 detects the crank angle and the number of rotations of crankshaft 110 based on the signal sent from crank position sensor 306.

Sensor 308 for the opening position of the throttle detects an opening position of the throttle and sends a signal representing the detection result to engine ECU 200. Vehicle speed sensor 310 detects the number of rotations of a wheel (not shown) and sends a signal representing the detection result to engine ECU 200. Engine ECU 200 calculates the vehicle speed based on the number of rotations of the wheel. Ignition switch 312 is turned on by a driver when engine 100 is to be started. Air flow meter 314 detects the amount of intake air into engine 100 and sends a signal representing the detection result to engine ECU 200.

Engine ECU 200 is operated by electric power supplied from an auxiliary battery 320 that is a power supply. Engine ECU 200 performs computation based on signals sent from respective sensors and ignition switch 312 as well as a map and a program stored in a ROM (Read-Only Memory) 202, and controls the devices so as to bring engine 100 into a desired operation state.

In the embodiment, engine ECU 200 detects a waveform of vibration (hereafter referred to as "vibration waveform") of engine 100 in a predetermined knock detection gate (a section between a predetermined first crank angle and a predetermined second crank angle) based on the signal sent from knock sensor 300 and the crank angle, and determines whether or not knocking has occurred in engine 100 based on the detected vibration waveform. The knock detection gate in the embodiment is the portion from the top dead center (0°) to 90° in a combustion stroke. The knock detection gate is not limited to this.

Figure 2:
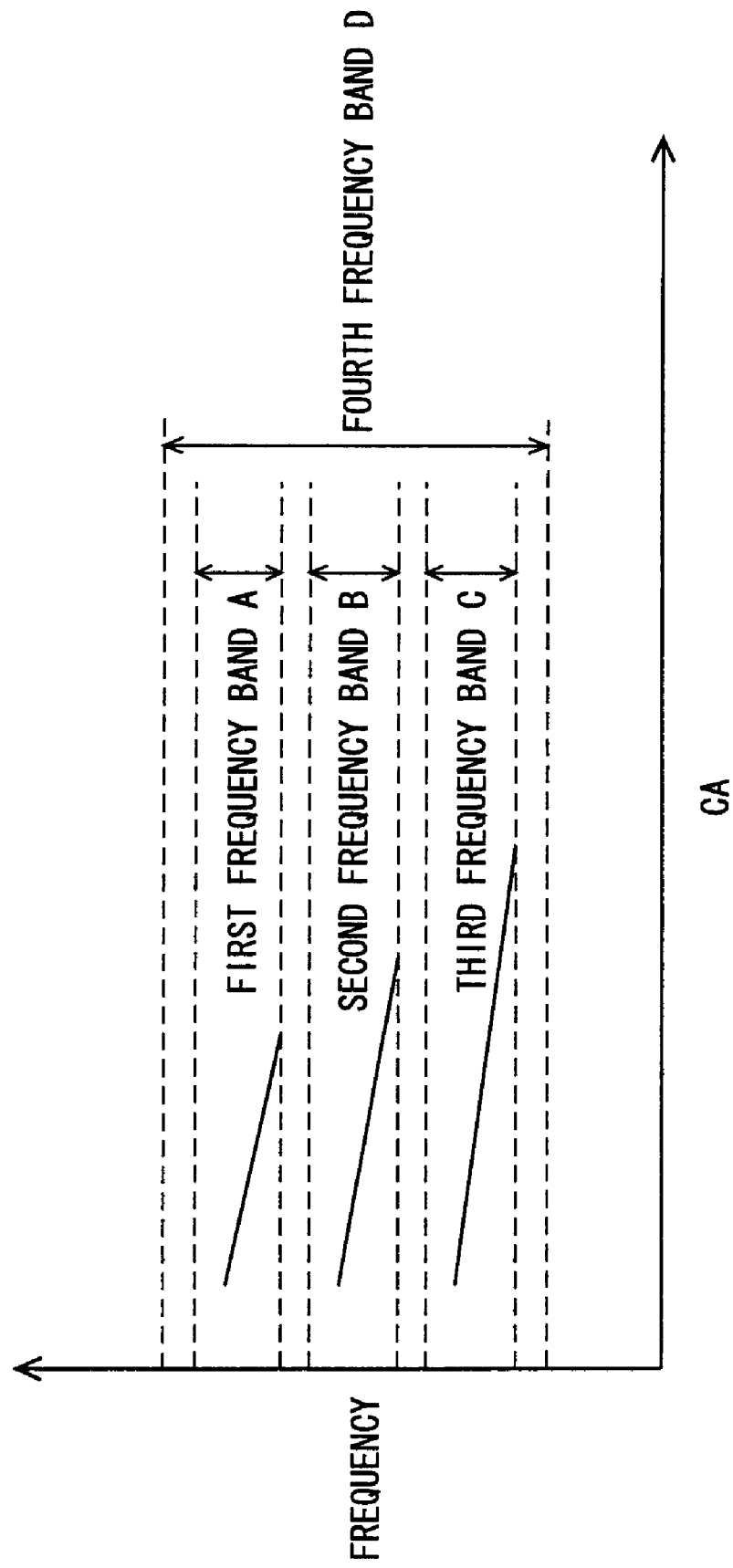
FIG. 2 shows a frequency band of vibration generated in the engine when knocking occurs.

When knocking occurs, vibration at a frequency near the frequency shown by a solid line in FIG. 2 is generated in engine 100. The frequency of the vibration generated due to the knocking is not constant and varies in a certain range of frequency. Therefore, in the embodiment, as shown in FIG. 2, the vibration in a fourth vibration band D including a first frequency band A, a second frequency band B and a third frequency band C is detected. In FIG. 2, CA represents the crank angle. The number of frequency bands of vibration generated due to the knocking is not restricted to three.

Figure 3:
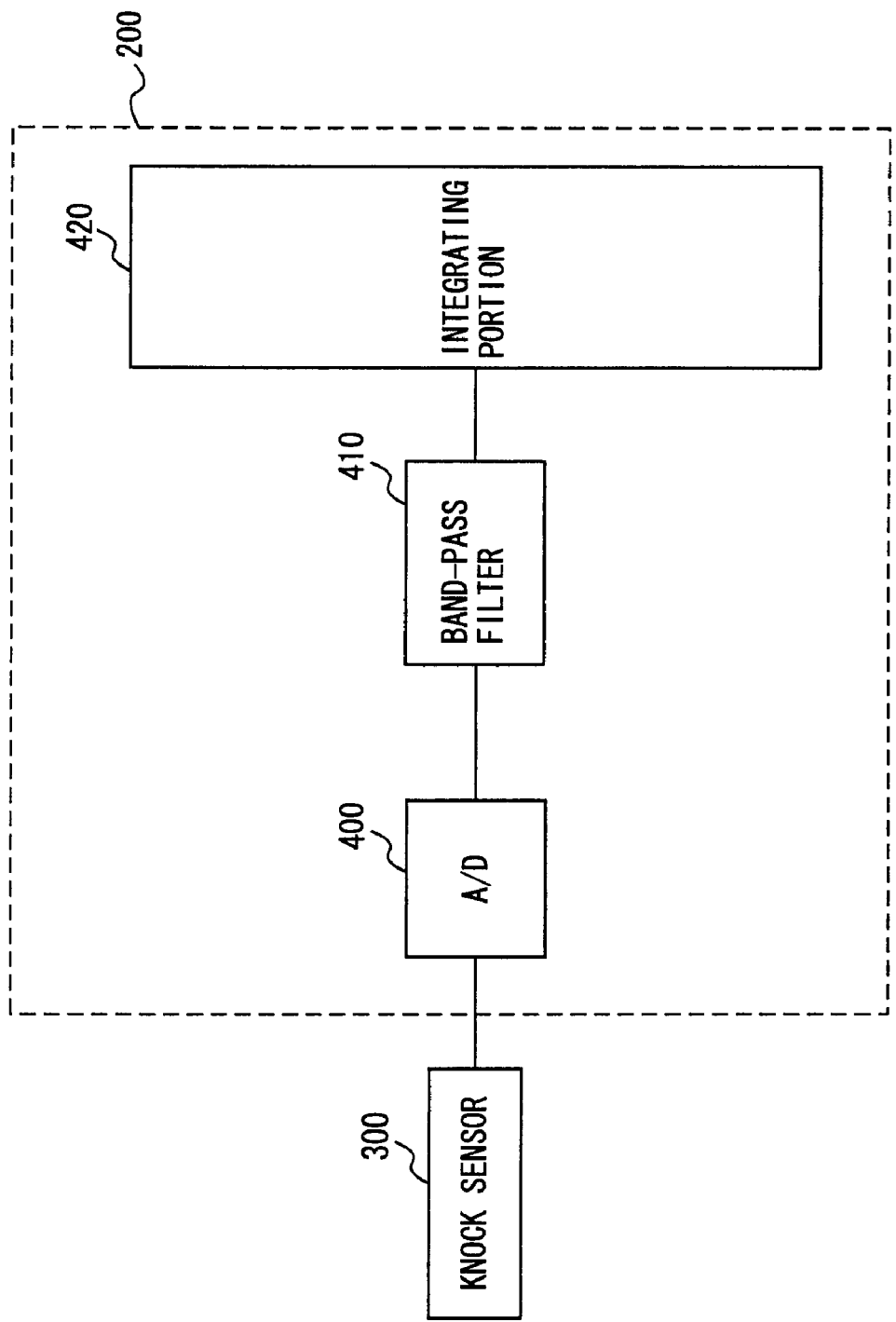
FIG. 3 is a control block diagram showing the engine ECU in FIG. 1.

With reference to FIG. 3, engine ECU 200 will be further described. Engine ECU 200 includes an A/D (analog/digital) converter 400, a band-pass filter 410 and an integrating portion 420.

A/D converter 400 converts an analog signal sent from knock sensor 300 into a digital signal. Band-pass filter 410 allows passage of only signals in the fourth frequency band D out of signals sent from knock sensor 300. In other words, band-pass filter 410 extracts only the vibration in the fourth frequency band D from the vibration detected by knock sensor 300.

Figure 4:
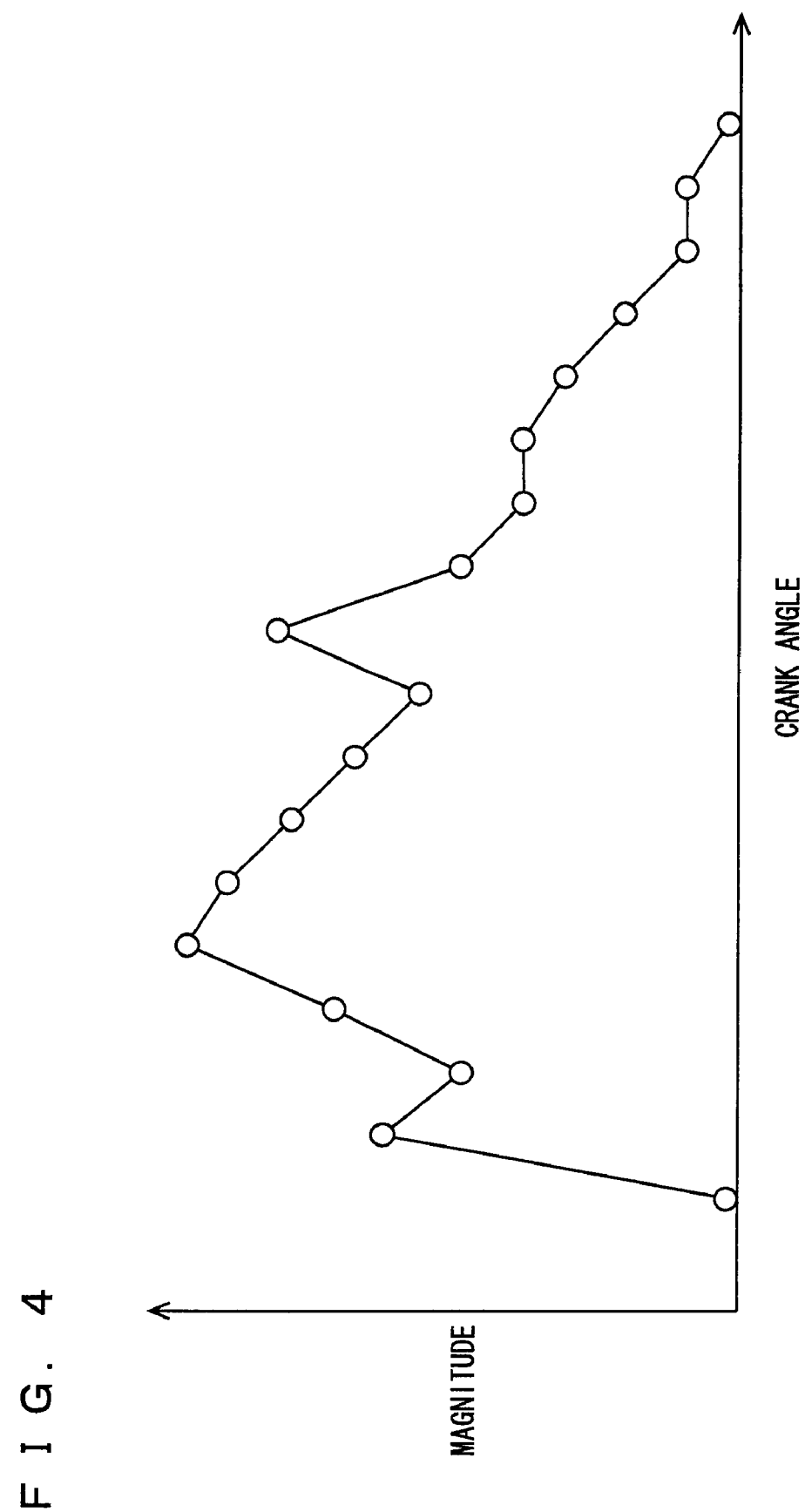
FIG. 4 is a diagram showing a vibration waveform of the engine.

Integrating portion 420 integrates signals selected by band-pass filter 410, i.e., magnitudes of vibration for a crank angle of 5° at a time. The resultant value determined by the integration for every 5° of the crank angle is hereinafter referred to as 5CA integrated value. By calculating the 5CA integrated value in association with the crank angle, the vibration waveform of engine 100 is detected as shown in FIG. 4.

The detected vibration waveform is compared with a knock waveform model stored in ROM 202 of engine ECU 200 as shown in FIG. 5. The knock waveform model is formed in advance as a model of the vibration waveform when the knocking occurs in engine 100. In this embodiment, the knock waveform model is formed as a model of vibration waveform corresponding to an interval of crank angle of 40°. Here, the interval of crank angle for which the knock waveform model is formed is not limited to 40°.

In the knock waveform model, the magnitudes of vibration are expressed as dimensionless numbers in a range of 0 to 1 and the magnitude of vibration is not uniquely associated with the crank angle. In other words, for the knock waveform model of the embodiment, while the magnitude of vibration is defined as the one that decreases as the crank angle increases after a peak value of the magnitude of vibration, a crank angle at which the magnitude of vibration has the peak value is not defined.

The knock waveform model is formed and stored in advance based on a vibration waveform of engine 100 detected when knocking is forcibly generated experimentally.

The knock waveform model is formed by using engine 100 with dimensions of engine 100 and an output value of knock sensor 300 which are median values of dimensional tolerance and tolerance of the output value of knock sensor 300 (hereafter referred to as "median characteristic engine"). In other words, the knock waveform model is a vibration waveform in the case where the knocking is forcibly generated in the median characteristic engine. The method of forming the knock waveform model is not limited to this, and the model may alternatively be formed by simulation.

Figure 6:
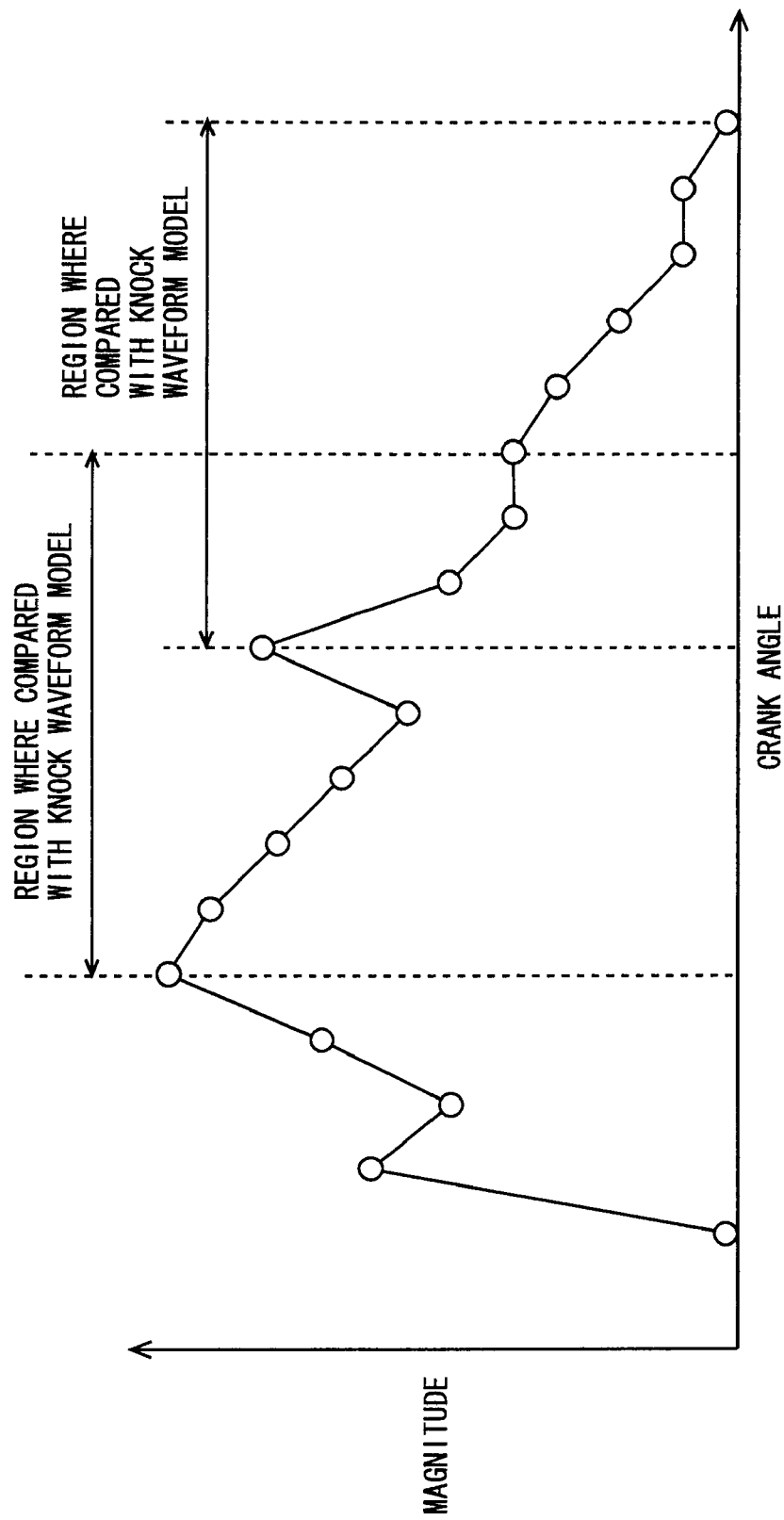
FIG. 6 shows regions for comparing the vibration waveform and the knock waveform model with each other according to a first embodiment of the present invention.

In the following, a description will be given of a method of comparing the vibration waveform with the knock waveform model according to the embodiment. The region of crank angle in which the vibration waveform and the knock waveform are compared with each other is, as shown in FIG. 6, a region starting from a crank angle at which the 5CA integrated value, namely magnitude, is larger than respective magnitudes at adjacent crank angles.

In the embodiment, the vibration waveform and the knock waveform model are compared with each other in regions that start respectively from crank angles at which the 5CA integrated values are the largest two among 5CA integrated values larger than respective magnitudes at adjacent crank angles, and this comparison is made within the knock detection gate. Therefore, when the vibration waveform and the knock waveform model are compared with each other, if the knock waveform model is wholly included within the knock detection gate, the vibration waveform and the knock waveform model are compared with each other in the region corresponding to the crank angle interval of 40° that is identical to that of the knock waveform model. When the vibration waveform and the knock waveform model are compared with each other, if the knock waveform model is partially located beyond the knock detection gate, the vibration waveform and the knock waveform model are compared with each other in the region corresponding to a crank angle interval smaller than 40°.

Figure 7:
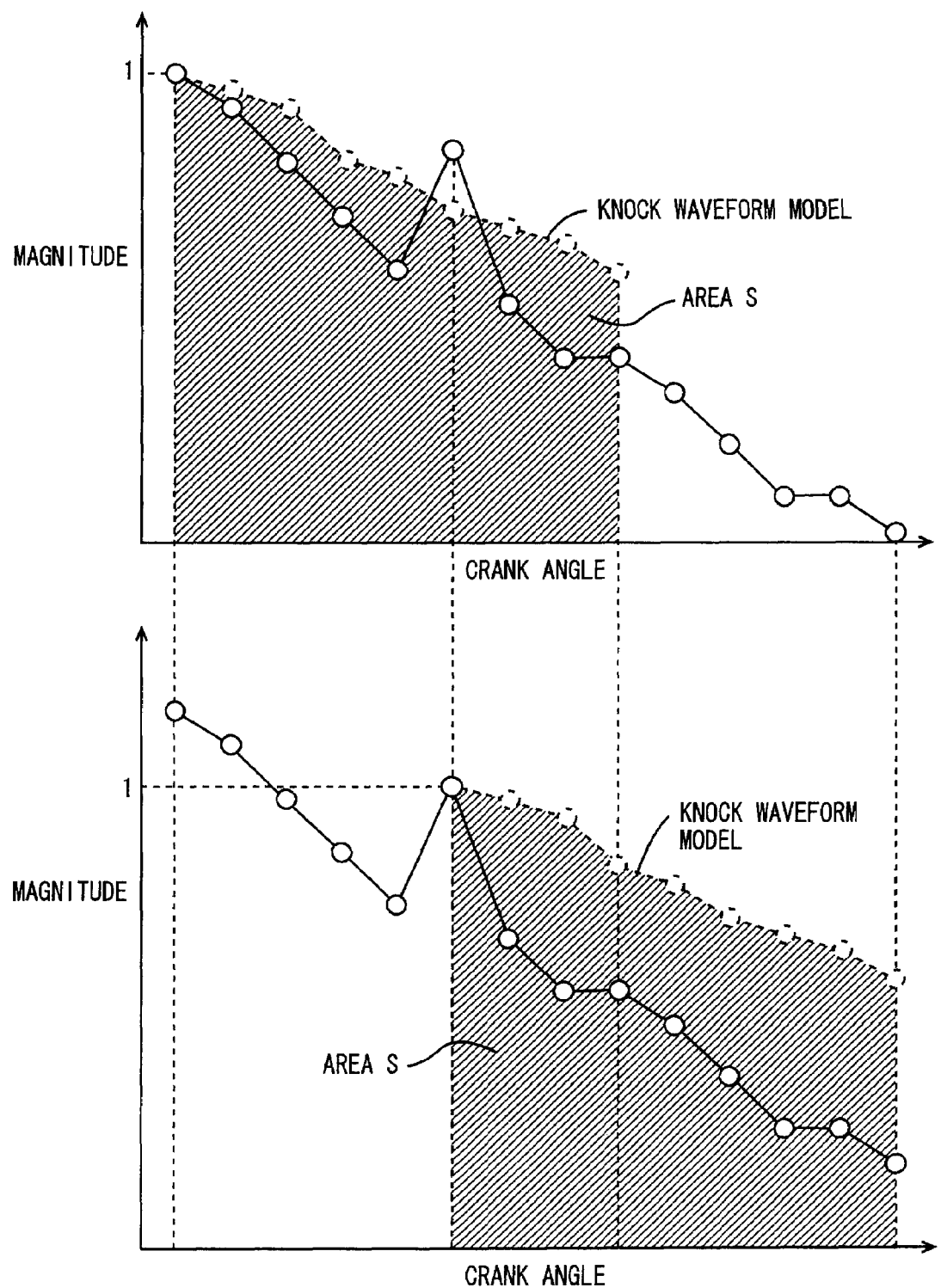
FIG. 7 shows the vibration waveform and the knock waveform model as compared with each other.

As shown in FIG. 7, the crank angle at which the 5CA integrated value is larger than respective magnitudes at adjacent crank angles and the leftmost end of the knock waveform model are matched in position, and the vibration waveform is compared with the knock waveform model in each region.

When the vibration waveform is compared with the knock waveform model, as shown in FIG. 7, the waveform is normalized for each of the regions where the comparison is made. Here, the normalization means to express the magnitude of vibration as a dimensionless number in a range of 0 to 1 by dividing, for example, by the maximum 5CA integrated value in the region where the comparison is made, namely the leftmost 5CA integrated value in the region where the comparison is made, other 5CA integrated values each. However, the method of normalization is not limited to this.

In the embodiment, engine ECU 200 calculates a correlation coefficient K which represents the degree of similarity of the normalized vibration waveform to the knock waveform model (represents a deviation of the vibration waveform and the knock waveform model from each other).

The absolute value of the difference (deviation amount) between the magnitude in the normalized vibration waveform and the magnitude in the knock waveform model is calculated for each crank angle (every 5° of the crank angle) to thereby calculate correlation coefficient K. The absolute value of the difference between the magnitude in the vibration waveform and the magnitude in the knock waveform model may alternatively be calculated for every crank angle other than 5°.

Supposing that the absolute value of the difference between the magnitude in the normalized vibration waveform and the magnitude in the knock waveform model for each crank angle is ΔS(I) (I is a natural number). As shown using the oblique lines in FIG. 7, the total magnitude of vibration in the knock waveform model, namely the area of the knock waveform model, is represented by S. Then, correlation coefficient K is calculated by the equation:

$$K=(S-\Sigma\Delta S(I))/S \quad (1)$$

where ΣΔS(I) is the total of ΔS(I). Equation (1) is used to calculate correlation coefficient K for each region.

In the embodiment, the closer a shape of the vibration waveform to a shape of the knock waveform model, the larger the calculated correlation coefficient K is. The method of calculating correlation coefficient K is not limited to this.

Engine ECU 200 determines that, when correlation coefficient K is equal to or larger than a threshold value K(0), the condition that there is a possibility of occurrence of knocking is satisfied. When correlation coefficient K is smaller than threshold value K(0), the engine ECU determines that the condition that there is a possibility of occurrence of knocking is not satisfied. Here, the determination may alternatively be made as to whether or not any condition is satisfied other than the condition that there is a possibility of occurrence of knocking.

In the case where there is a possibility that knocking has occurred, engine ECU 200 uses a value determined by integrating magnitudes for a crank angle interval of 40°, namely integrating magnitudes for the same interval of crank angle as the knock waveform model to determine whether or not knocking has occurred. In the following, a value determined by integrating the magnitudes for the crank angle of 40° is referred to as 40CA integrated value. The value determined by integrating magnitudes for any interval of crank angle other than 40° may alternatively be used.

Figure 8:
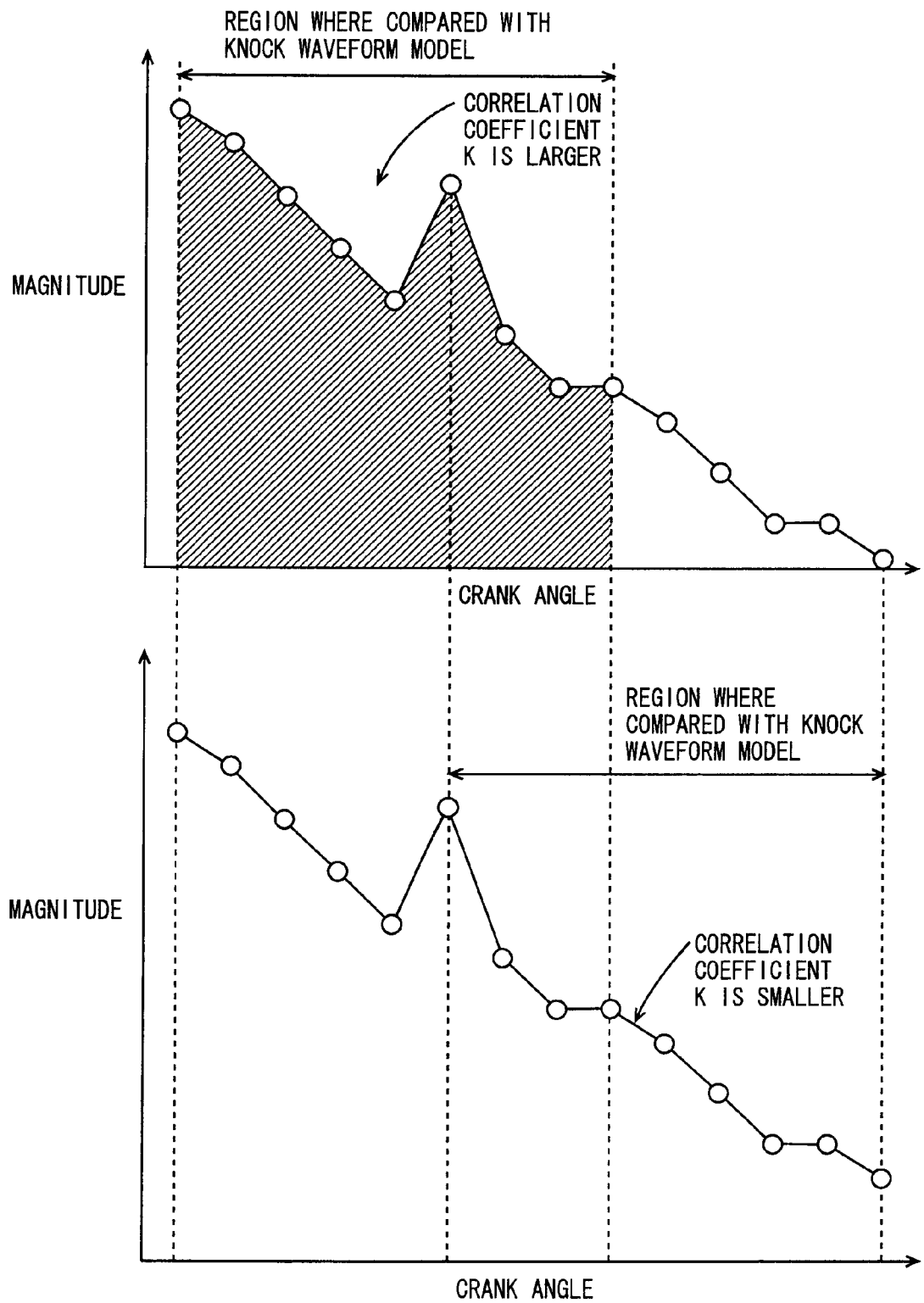
FIG. 8 is a (first) diagram showing a 40CA integrated value.

The crank angles with respective magnitudes from which the 40CA integrated value is calculated is the crank angles in the region where correlation coefficient K is relatively larger than other regions as indicated by the oblique lines in FIG. 8. Here, the 40CA integrated value may be calculated by integrating magnitudes at crank angles corresponding to 40° that include any crank angle in a part of the region where correlation coefficient K is relatively larger.

A knock magnitude N is calculated by dividing the 40CA integrated value by a BGL (Back Ground Level) representing the magnitude of vibration of engine 100 where knocking does not occur. BGL is determined in advance by simulation or experiment for example and stored in ROM 202. The method of calculating knock magnitude N is not limited to this.

In the embodiment, engine ECU 200 compares calculated knock magnitude N and a determination value V(KX) stored in ROM 202 with each other, and further compares the detected waveform and the stored knock waveform model with each other. Then, engine ECU 200 determines whether or not knocking has occurred in engine 100 for each ignition cycle.

As shown in FIG. 9, determination values V(KX) are stored as a map for respective ranges divided according to an operation state represented by the parameters that are engine speed NE and intake air amount KL. In the embodiment, nine ranges for each cylinder are provided, which are divided as follows: low speed (NE<NE(1)); medium speed (NE(1)≦NE<NE(2)); high speed (NE(2)≦NE); low load (KL<KL(1)); medium load (KL(1)≦KL<KL(2)); and high load (KL(2)≦KL). The number of the ranges is not limited to this. The ranges may alternatively be divided using parameters other than engine speed NE and intake air amount KL.

At the time of shipment of engine 100 or the vehicle, a value determined in advance by an experiment or the like is used as determination value V(KX) stored in ROM 202 (an initial value of determination value V(KX) at the time of shipment). However, because of variation in the output values and degradation of knock sensor 300, the same vibrations occurring in engine 100 could be detected as vibrations of respective magnitudes different from each other. In this case, it is necessary to correct determination value V(KX) and to determine whether or not knocking has occurred by using determination value V(KX) appropriate for the magnitude detected actually.

Figure 10:
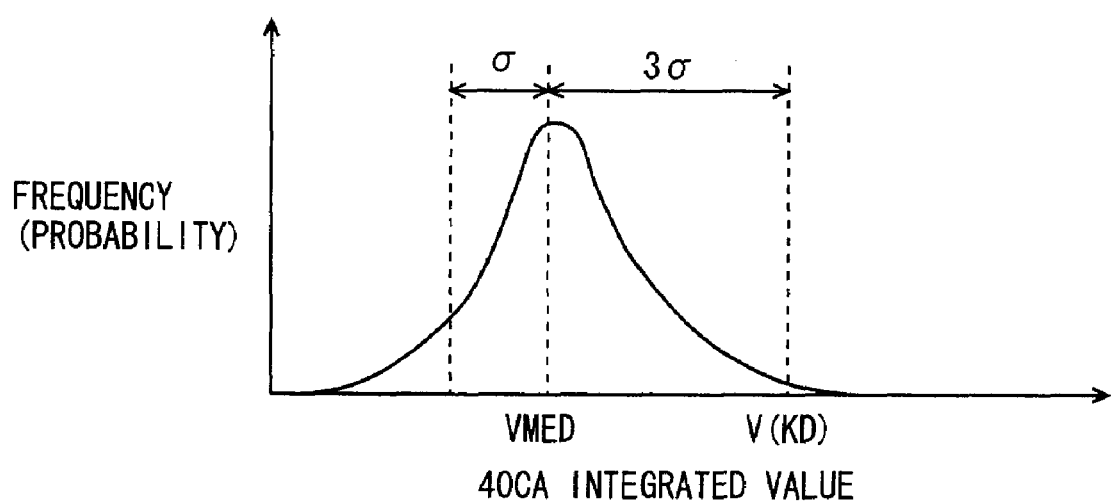
FIG. 10 shows a frequency distribution of 40CA integrated values.

Thus, in the embodiment, as shown in FIG. 10, the frequency distribution representing a relation between the 40CA integrated value and the frequency (the number of times, also referred to probability) at which each 40CA integrated value is calculated is used to correct determination value V(KX).

For each range based on the parameters that are engine speed NE and intake air amount KL, the frequency distribution of the 40CA integrated value is prepared. For the frequency distribution, a value determined by logarithmically converting the 40CA integrated value is used.

As shown in FIG. 10, for the frequency distribution, a median value VMED at which the accumulative sum of frequencies of 40CA integrated values from the minimum value reaches 50% as well as a standard deviation σ are calculated.

In the embodiment, a median value VMED and a standard deviation σ, which approximate the median value and standard deviation calculated based on a plurality of 40CA integrated values (e.g., in 200 cycles) are calculated, by the method as described below, each time the 40CA integrated value is calculated.

If the currently detected 40CA integrated value is larger than the previously calculated median value VMED, a predetermined value C(1) is added to the previously calculated median value VMED to determine the current median value VMED. On the contrary, if the currently detected 40CA integrated value is smaller than the previously calculated median value VMED, a predetermined value C(2) is subtracted from the previously calculated median value VMED (C(2) is equal to C(1) for example) to determine the current median value VMED.

If the currently detected 40CA integrated value is smaller than the previously calculated median value VMED and larger than a value determined by subtracting the previously calculated standard deviation σ from the previously calculated median value VMED, a value twice as large as a predetermined value C(3) is subtracted from the previously calculated standard deviation σ for using it as current standard deviation σ. On the contrary, if the currently detected 40CA integrated value is larger than the previously calculated median value VMED or smaller than a value determined by subtracting the previously calculated standard deviation σ from the previously calculated median value VMED, a predetermined value C(4) (C(4) is equal to C(3) for example) is added to the previously calculated standard deviation σ for use it as the current standard deviation σ. The methods of calculating median value VMED and standard deviation σ are not limited to this. Further, the initial values of median value VMED and standard deviation σ may be values set in advance or may be "0".

These median value VMED and standard deviation σ are used to calculate a knock determination level V(KD). As shown in FIG. 10, to median value VMED, the product of a coefficient U (U is a constant, for example, U=3) and standard deviation σ is added for using the resultant value as knock determination level V(KD). The method of calculating knock determination level V(KD) is not limited to this.

The proportion or ratio (frequency) of 40CA integrated values that are greater than knock determination level V(KD) is determined as a frequency of occurrence of knocking, and counted as knock proportion KC. If knock proportion KC is greater than a threshold value KC(0), then determination value V(KX) is corrected to be decreased by a predetermined correction amount so that the frequency of retarding the ignition timing becomes higher. If knock proportion KC is smaller than threshold value KC(0), then determination value V(KX) is corrected to be increased by a predetermined correction amount so that the frequency of advancing ignition timing becomes higher.

Coefficient U is a coefficient obtained based on data and findings through experiments and the like. 40CA integrated value greater than knock determination level V(KD) when U=3 substantially agrees with 40CA integrated value in an ignition cycle in which knocking has actually occurred. Any value other than "3" may be used as coefficient U.

Figure 11:
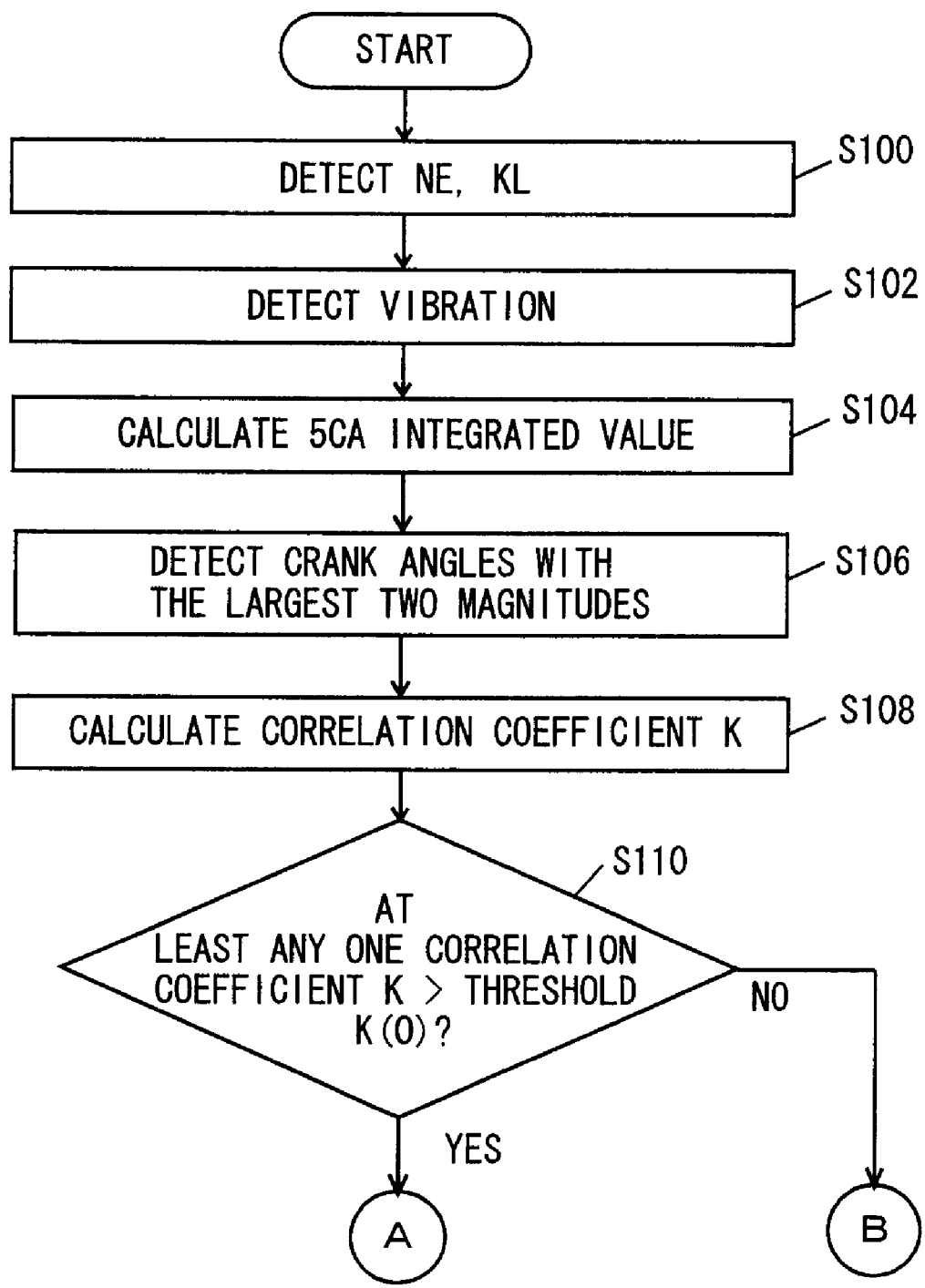
FIGS. 11 to 13 are (first to third) flowcharts showing a control structure of a program executed by the engine ECU that is the knocking determination device according to the first embodiment of the present invention.
Figure 12:
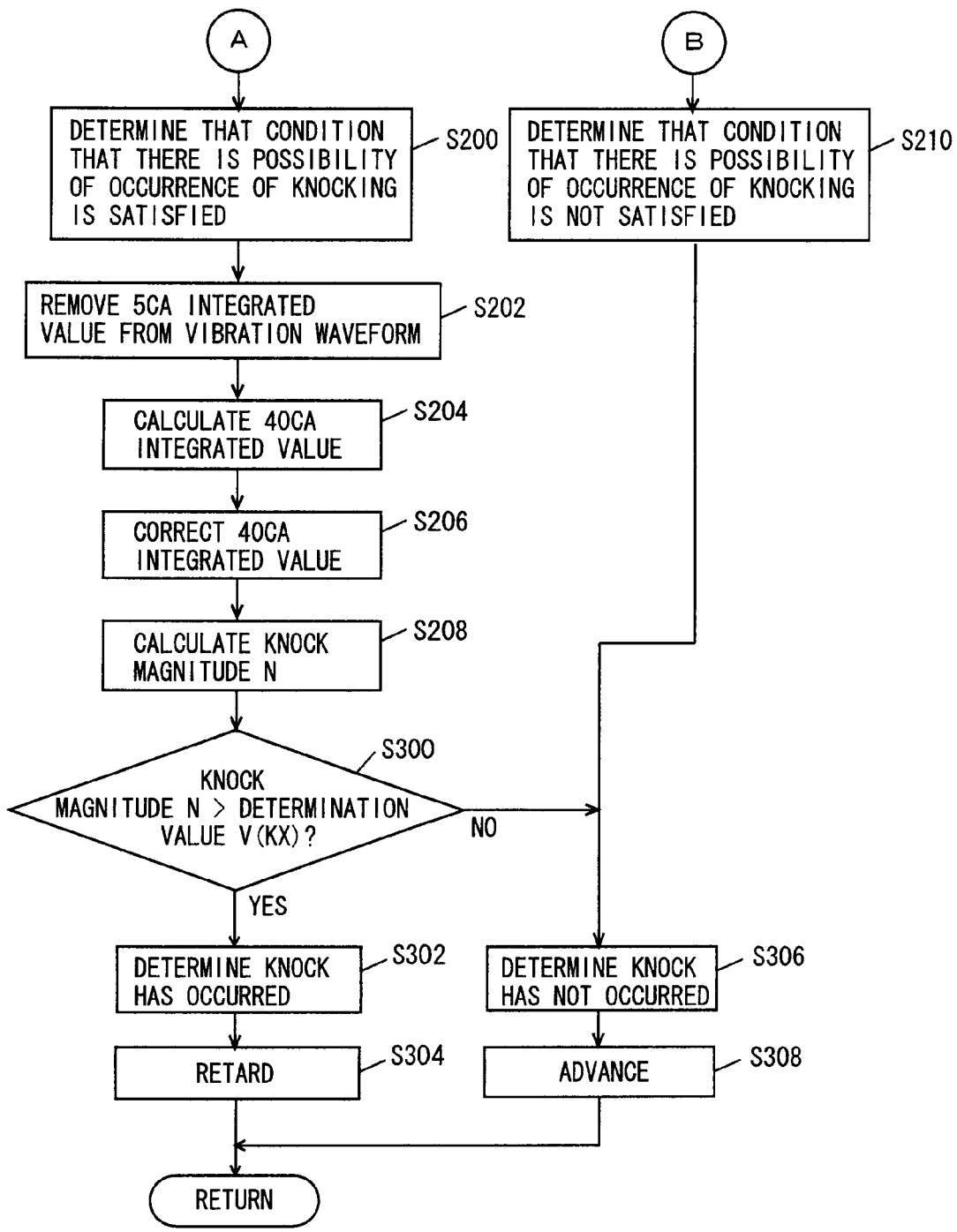

With reference to FIGS. 11 and 12, a description will be given of a control structure of a program executed by engine ECU 200 which is the knocking determination device according to the embodiment, in order to determine whether or not knocking has occurred in each ignition cycle.

In step 100 (hereafter "step" will be abbreviated as "S"), engine ECU 200 detects engine speed NE based on a signal sent from crank position sensor 306 and detects intake air amount KL based on a signal sent from air flow meter 314.

In S102, engine ECU 200 detects the magnitude of vibration of engine 100 based on a signal sent from knock sensor 300. The magnitude of vibration is expressed as an output voltage of knock sensor 300. The magnitude of vibration may be expressed as a value corresponding to the output voltage of knock sensor 300. Detection of the magnitude is carried out between the top dead center and 90° (a crank angle of 90°) in a combustion stroke.

In S104, engine ECU 200 calculates the 5CA integrated value by integrating the output voltage values (values representing the magnitudes of vibration) of knock sensor 300 for every 5° (for 5°) of the crank angle to thereby detect a vibration waveform of engine 100.

In S106, engine ECU 200 detects crank angles at which the 5CA integrated values are the largest two among those that are each larger than respective 5CA integrated values at adjacent crank angles, out of the 5CA integrated values of the vibration waveform of engine 100.

In S108, engine ECU 200 compares the region starting from the 5CA integrated value larger than respective 5CA integrated values at adjacent crank angles with the knock waveform model, and calculates correlation coefficient K for each region.

In S110, engine ECU 200 determines whether or not at least any one of the calculated correlation coefficients K is equal to or larger than threshold value K(0). When at least one of the calculated correlation coefficients K is equal to or larger than threshold value K(0) (YES in S110), the process proceeds to S200. Otherwise (NO in S110), the process proceeds to S210.

In S200, engine ECU 200 determines that the condition that there is a possibility of occurrence of knocking is satisfied.

In S202, engine ECU 200 removes, from the vibration waveform, magnitudes for a range of crank angle of 10° from the leftmost crank angle in the region of the vibration waveform where correlation coefficient K is smaller than threshold value K(0). Here, the magnitudes for any range of crank angle other than 10° may be removed from the vibration waveform. Further, the magnitudes at crank angles from any crank angle other than the leftmost crank angle in the region where correlation coefficient K is smaller than threshold value K(0) in the vibration waveform may be removed. If no correlation coefficient K is smaller than threshold value K(0), this process step is not performed.

In S204, engine ECU 200 calculates the 40CA integrated value by integrating magnitudes in a region where correlation coefficient K is larger than threshold value K(0) for a range of crank angle of 40°. When all of the calculated correlation coefficients K are larger than threshold value K(0), magnitudes in a region where correlation coefficient K is relatively larger are used to calculate the 40CA integrated value.

In S206, engine ECU 200 corrects the 40CA integrated value to compensate for the magnitudes removed from the vibration waveform. Specifically, the 40CA integrated value is corrected to be increased. For example, in the case where magnitudes for the range of crank angle of 10° are removed from magnitudes at crank angles from which the 40CA integrated value is calculated, the 40CA integrated value is multiplied by 8/6. If crank angles from which the 40CA integrated value is calculated do not include crank angles at which respective magnitudes are removed, this process step is not performed.

In S208, engine ECU 200 divides the 40CA integrated value by BGL to calculate knock magnitude N.

In S210, engine ECU 200 determines that the condition that there is a possibility of occurrence of knocking is not satisfied.

In S300, engine ECU 200 determines whether or not knock magnitude N is larger than determination value V(KX). When knock magnitude N is larger than determination value V(KX) (YES in S300), the process proceeds to S302. Otherwise (NO in S300), the process proceeds to S306.

In S302, engine ECU 200 determines that knocking has occurred. In S304, engine ECU 200 retards the ignition timing.

In S306, engine ECU 200 determines that knocking has not occurred. In S308, engine ECU 200 advances the ignition timing.

Figure 13:
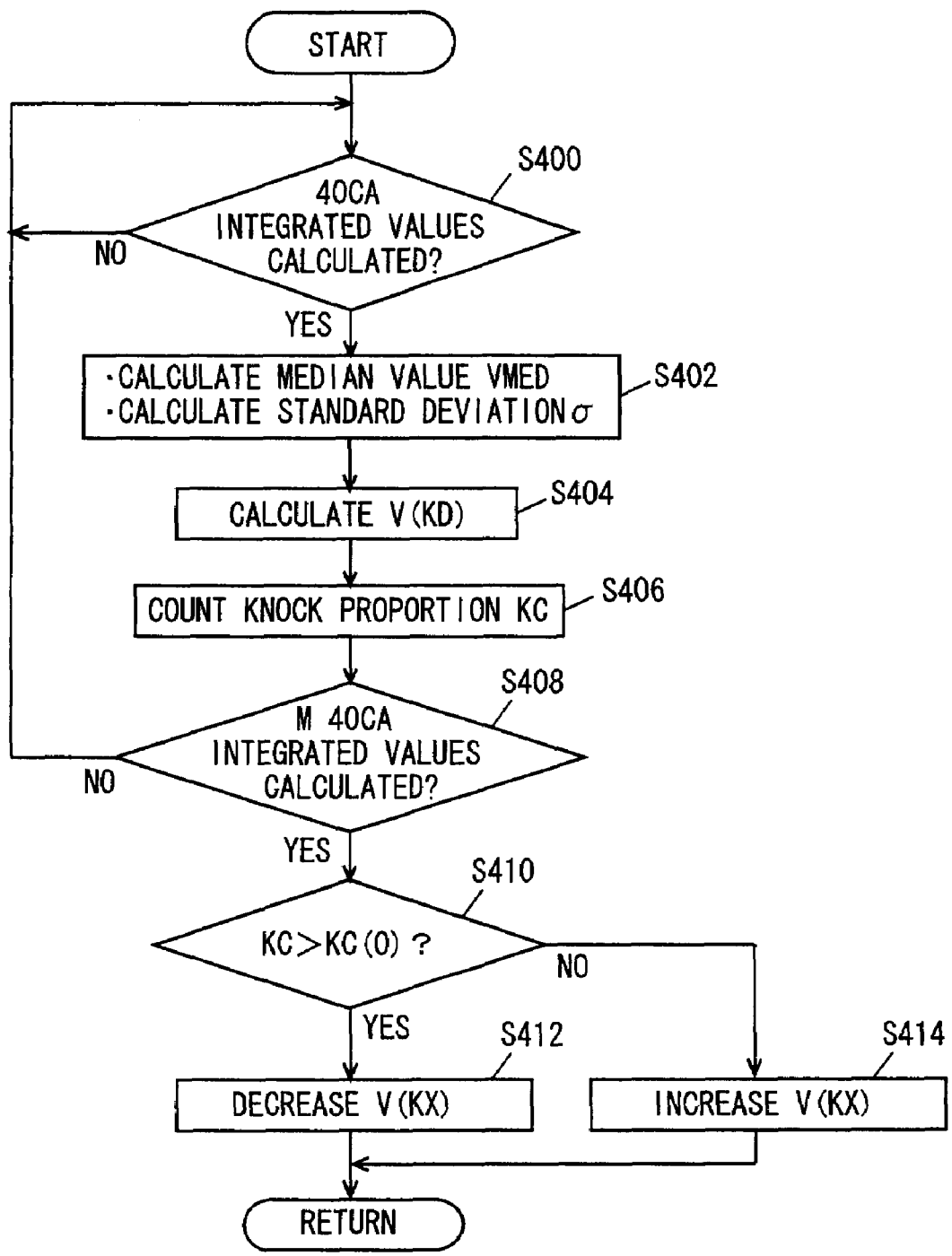

Referring to FIG. 13, a description will be given of a control structure of a program executed for correcting determination value V(KX) by engine ECU 200 which is the knocking determination device of the embodiment.

In S400, engine ECU 200 determines whether or not 40CA integrated values have been calculated. When the 40CA integrated values have been calculated (YES in S400), the process proceeds to S402. Otherwise (NO in S400), the process returns to S400.

In S402, engine ECU 200 calculates median value VMED and standard deviation σ of the calculated 40CA integrated values. Median value VMED and standard deviation σ may be calculated each time M (M is a natural number, for example, M=200) 40CA integrated values are calculated.

In S404, engine ECU 200 calculates knock determination level V(KD) based on median value VMED and standard deviation σ.

In S406, engine ECU 200 counts the number of 40CA integrated values larger than knock determination level V(KD), out of the calculated 40CA integrated values to determine the proportion of the counted values as knock proportion KC.

In S408, engine ECU 200 determines whether or not M 40CA integrated values (40CA integrated values in M ignition cycles) have been calculated since the last correction of determination value V(KX). When M 40CA integrated values have been calculated since the last correction of determination value V(KX) (YES in S408), the process proceeds to S410. Otherwise (NO in S408), the process returns to S400.

In S410, engine ECU 200 determines whether or not knock proportion KC is larger than threshold value KC(0). When knock proportion KC is larger than threshold value KC(0) (YES in S410), the process proceeds to S412. Otherwise (NO in S410), the process proceeds to S414.

In S412, engine ECU 200 decreases determination value V(KX) by a predetermined correction amount. In S414, engine ECU 200 increases determination value V(KX) by a predetermined correction amount.

An operation will be described of engine ECU 200 which is the knocking determination device of the embodiment based on the above-described configuration and flowcharts.

While engine 100 is operating, engine speed NE is detected based on the signal sent from crank position sensor 306 and intake air amount KL is detected based on the signal sent from air flow meter 314 (S100). Moreover, based on the signal sent from knock sensor 300, the magnitude of vibration of engine 100 is detected (S102).

Between the top dead center and 90° in the combustion stroke, the 5CA integrated values are calculated (S104). In this way, the above-described vibration waveform of engine 100 as shown in FIG. 4 is detected.

As the 5CA integrated values are used to detect the vibration waveform, the vibration waveform of which delicate magnitude variations are suppressed can be detected. Therefore, it is easy to compare the detected vibration waveform and the knock waveform model with each other.

This vibration waveform may include, in addition to the vibration due to knocking, such noise components mixed therein other than the knocking-generated vibration, as vibration generated when intake valve 116 or exhaust valve 118 closes and vibration generated upon actuation of injector 104 (particularly in-cylinder direct injector) or fuel pump 120. Thus, it is difficult to precisely determine whether or not knocking has occurred from only the maximum magnitude (5CA integrated value) of the vibration waveform.

Accordingly, the crank angles are detected at which respective 5CA integrated values are the largest two among 5CA integrated values each larger than respective 5CA integrated values at adjacent crank angles (S106). Regions from respective detected crank angles are each compared with the knock waveform model to calculate correlation coefficient K for each region (S108).

When all correlation coefficients K are smaller than threshold value K(0) (NO in S110), there is an extremely low possibility of occurrence of knocking. Therefore, it is determined that the condition that there is a possibility of occurrence of knocking is not satisfied (S210). In this case, it is determined that knocking has not occurred (S306) and the ignition timing is advanced (S308).

When at least any one correlation coefficient K among the calculated correlation coefficients K is larger than threshold value K(0) (YES in S110), there is a possibility of occurrence of knocking. Then, it is determined that the condition that there is a possibility of occurrence of knocking is satisfied (S200).

When there is a possibility of occurrence of knocking, the 40CA integrated value calculated from the magnitudes in the region where correlation coefficient K is relatively larger is used to make more precise determination as to whether or not knocking has occurred.

Figure 14:
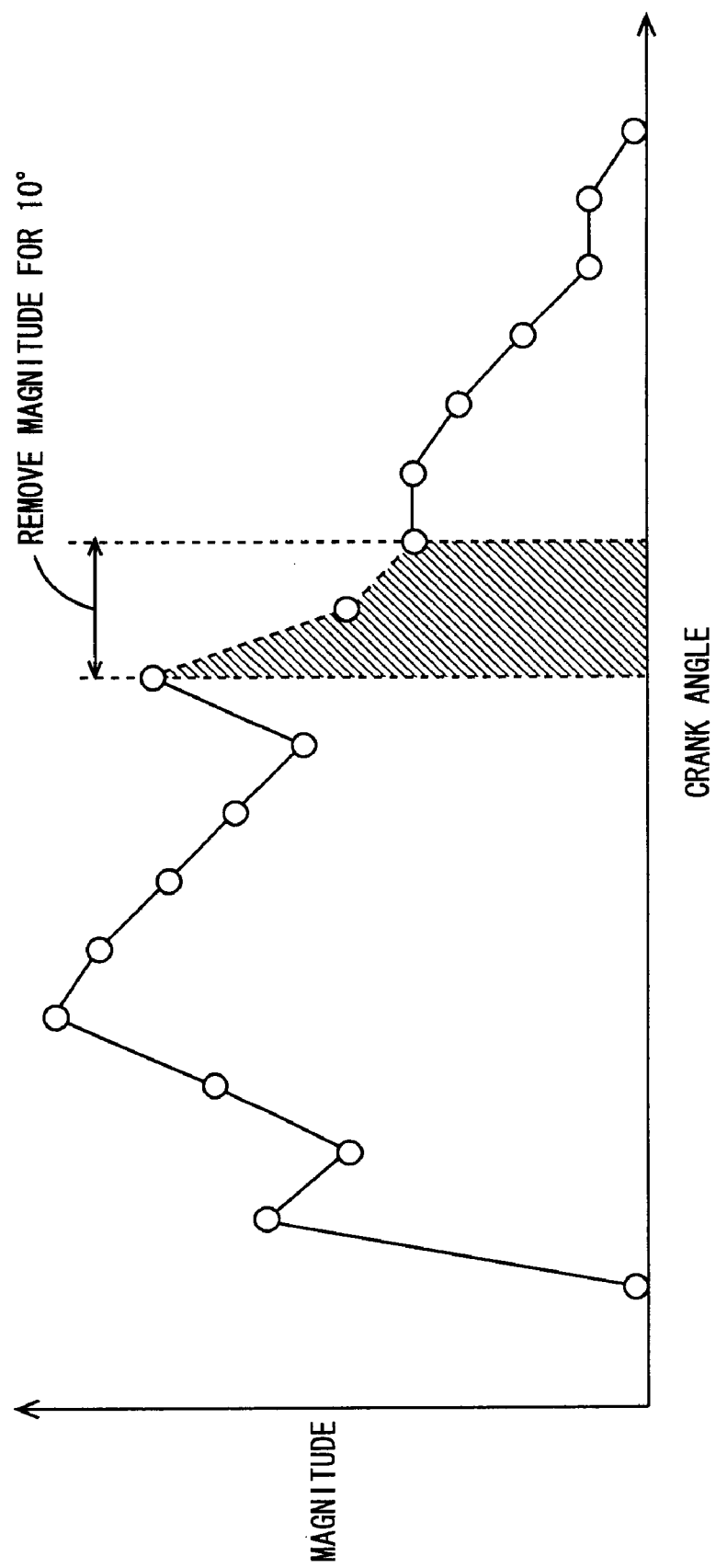
FIG. 14 is a diagram showing that a crank angle is removed from the vibration waveform in the first embodiment of the present invention.

At the crank angles from which the 40CA integrated value is calculated, if vibration of the noise component is included, the 40CA integrated value is excessively larger by the noise component. Then, if any correlation coefficient K is smaller than threshold value K(0), the magnitudes are removed as shown in FIG. 14 from the vibration waveform for the range of crank angle of 10° from the leftmost crank angle in the region where correlation coefficient K is smaller than threshold value K(0) in the vibration waveform (S202).

From the magnitudes of the vibration waveform from which the magnitudes for the range of crank angle of 10° are removed, the 40CA integrated value is calculated by integrating magnitudes for the range of crank angle of 40° in the region where correlation coefficient K is relatively larger (S204).

Figure 15:
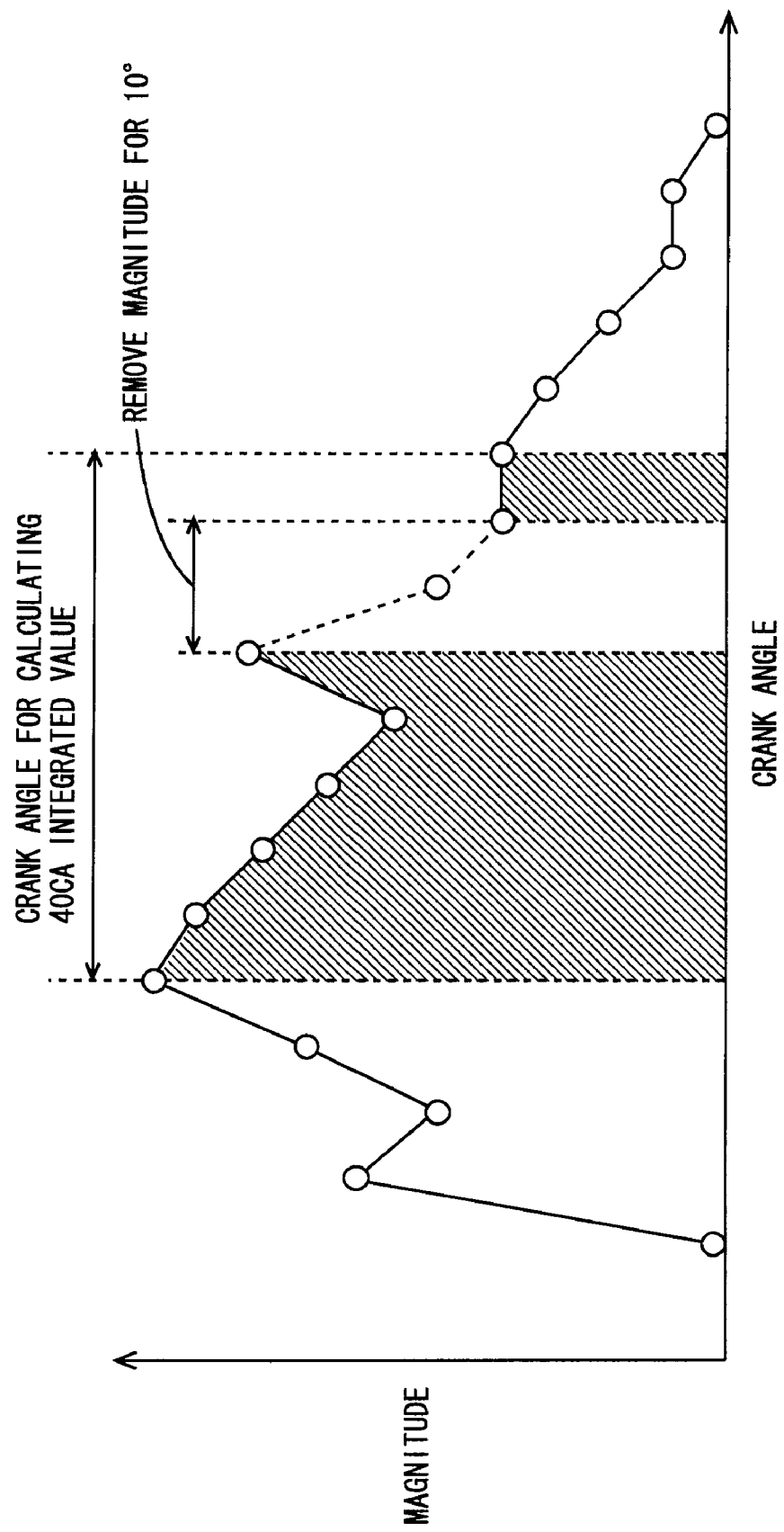
FIG. 15 is a (second) diagram showing a 40CA integrated value.

At this time, as shown in FIG. 15, if the magnitudes are completely removed from the magnitudes at crank angles from which the 40CA integrated value is calculated, the 40CA integrated value is smaller than required. Therefore, in order to compensate for the magnitudes removed from the vibration waveform, the 40CA integrated value is corrected (S206). The 40CA integrated value is divided by BGL to calculate knock magnitude N (S208).

When knock magnitude N is larger than determination value V(KX) (YES in S300), it is determined that knocking has occurred (S302) and the ignition timing is retarded (S304). In this way, occurrence of knocking can be suppressed.

When knock magnitude N is smaller than determination value V(KX) (NO in S300), it is determined that knocking has not occurred (S306) and the ignition timing is advanced (S308).

Here, the vibration has such characteristics that the vibration due to knocking attenuates gradually and the vibration due to the noise component attenuates rapidly. Therefore, the calculated 40CA integrated value is considerably different depending on whether the integrated value is calculated from the magnitudes of vibration due to knocking or the integrated value is calculated from magnitudes of vibration due to the noise component. From such 40CA integrated value, knock magnitude N is calculated.

In this way, a large difference can be provided between knock magnitude N in the case where knocking has occurred and knock magnitude N in the case where vibration due to the noise component is detected while knocking has not occurred. Therefore, the knock magnitude in the case where knocking has occurred and the knock magnitude in the case where vibration due to the noise component is detected while knocking has not occurred can be precisely distinguished from each other. Accordingly, whether or not knocking has occurred can be determined precisely.

It should be noted that, because of variation in the output values and degradation of knock sensor 300, the same vibrations occurring in engine 100 could be detected as vibrations of respective magnitudes different from each other. In this case, it is necessary to correct determination value V(KX) and to determine whether or not knocking has occurred by using determination value V(KX) appropriate for the magnitude detected actually.

Accordingly, engine ECU 200 which is the knocking determination device of the embodiment uses the frequency distribution of the 40CA integrated values to correct determination value V(KX). When the 40CA integrated values have been calculated (YES in S400), median value VMED and standard deviation σ of the calculated 40CA integrated values are calculated (S402). Based on these median value VMED and standard deviation σ, knock determination level V(KD) is calculated (S404).

The number of 40CA integrated values larger than determination level V(KD) is counted to determine knock proportion KC (S406). When M 40CA integrated values have been calculated since the last correction of determination value V(KX) (YES in S408) and in the case where knock proportion KC is larger than threshold KC(0) (YES in S410), determination value V(KX) is decreased (S412). Thus, it is more likely to be determined that knocking has occurred. Therefore, the frequency at which the ignition timing is retarded can be made higher.

In the case where knock proportion KC is smaller than threshold value KC(0) (NO in S410), determination value V(KX) is increased (S414). Thus, it is more likely to be determined that knocking has not occurred. Therefore, the frequency at which the ignition timing is advanced can be made higher.

As described above, regarding the engine ECU which is the knock determination device of the present embodiment, the vibration waveform is compared with the knock waveform model and, as a result, when it is determined that the condition that there is a possibility of occurrence of knocking is satisfied, the 40CA integrated value is calculated by integrating magnitudes for a range of crank angle of 40°. Thus, the 40CA integrated value can be obtained that is considerably different depending on whether the value is calculated from magnitudes of vibration due to knocking or the value is calculated from magnitudes of vibration due to the noise component.

Therefore, knock magnitude N calculated from vibration due to knocking can be made larger than knock magnitude N calculated from vibration due to the noise component. Accordingly, knock magnitude N can be compared with determination value V(KX) to precisely determine whether or not knocking has occurred.

Second Embodiment

In the following, a second embodiment of the present invention will be described. The present embodiment differs from the first embodiment in that the vibration waveform and the knock waveform model are compared with each other in three regions of the vibration waveform and in that the value determined by integrating magnitudes at crank angles from the top dead center to 90° is used to determine whether or not knocking has occurred. In addition, the second embodiment differs from the first embodiment in that whether or not knocking has occurred is determined using the value determined by integrating magnitudes at crank angles from the top dead center to 90° for both of the case where the condition that there is a possibility of knocking is satisfied and the case where the condition that there is a possibility of knocking is not satisfied.

Other elements are similar to those of the first embodiment. Respective functions are also similar thereto. Therefore, the detailed description thereof will not be repeated here.

In the following, a method of comparing a vibration waveform with a knock waveform model will be described.

Figure 16:
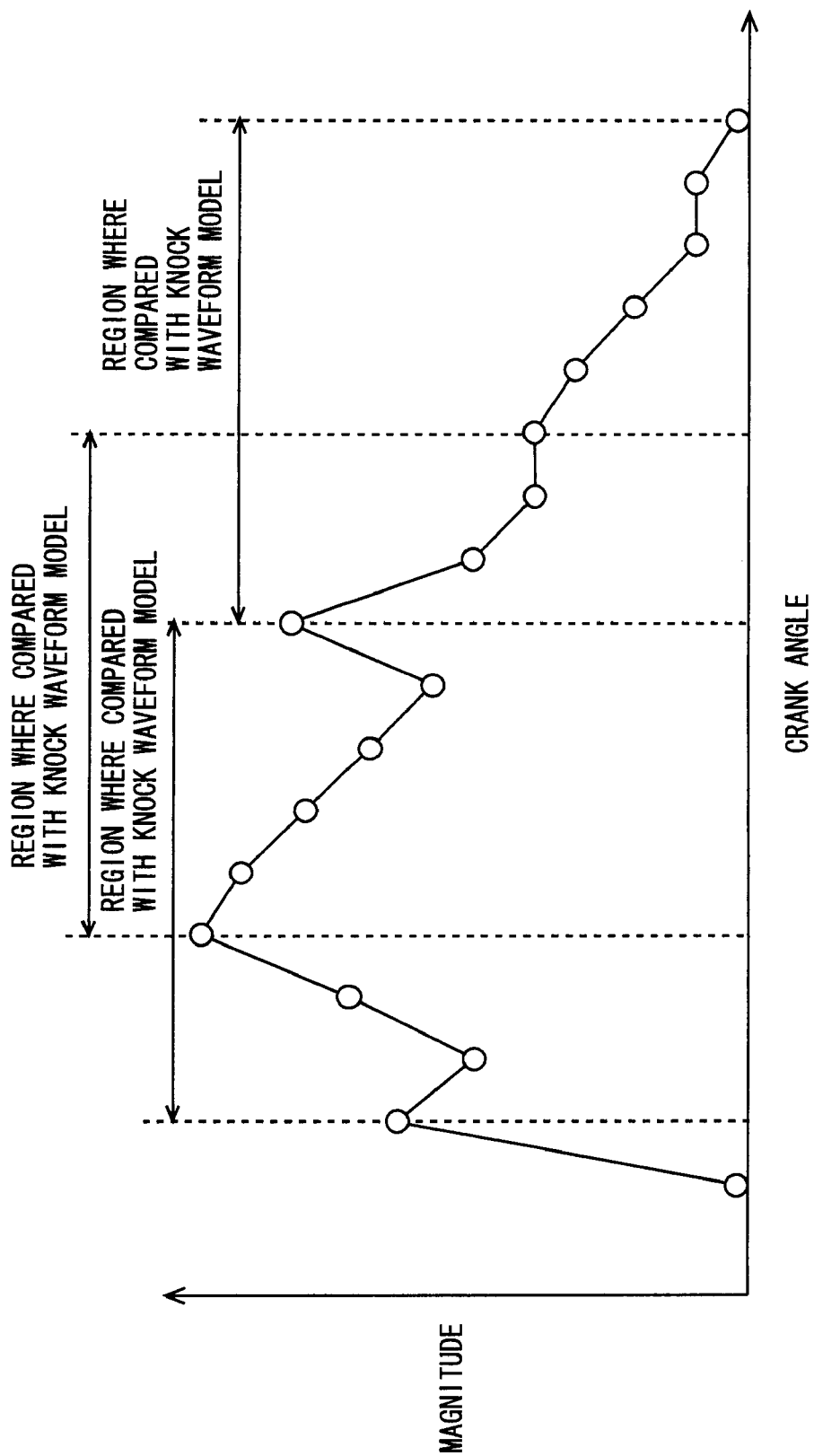
FIG. 16 shows regions for comparing a vibration waveform and a knock waveform model according to a second embodiment of the present invention.

In the present embodiment, as shown in FIG. 16, there are regions starting respectively from three crank angles at which respective 5CA integrated values are the largest three 5CA integrated values among those each larger than the 5CA integrated values at adjacent crank angles, and the regions are included in the knock detection gate. In these regions each, the vibration waveform and the knock waveform are compared with each other. The method of making the comparison with the knock waveform model in each region is identical to the one in the first embodiment and therefore, the detailed description will not be repeated here.

Figure 17:
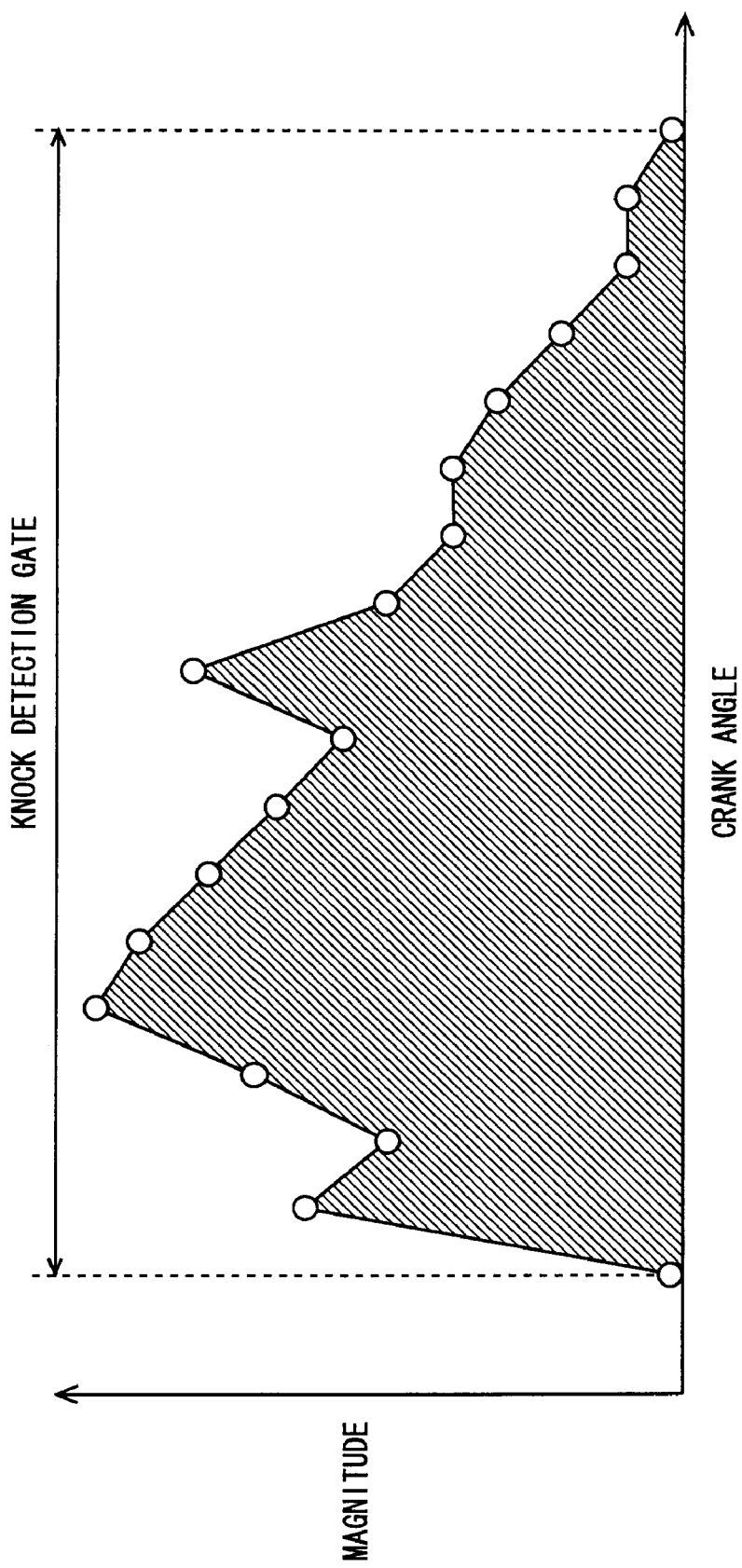
FIG. 17 is a diagram showing a 90CA integrated value.

In the present embodiment as different from the first embodiment, the magnitudes are integrated in the range of crank angle from the top dead center to 90°, namely the range of crank angle identical to the knock detection gate, as shown by the oblique lines in FIG. 17, to use the resultant integrated value for determining whether or not knocking has occurred. In the following, the value determined by integrating the magnitudes in the range of crank angle from the top dead center to 90° will be referred to as 90CA integrated value. The 90CA integrated valued is divided by BGL to calculate knock magnitude N.

Here, the value determined by integrating the magnitudes in a range of crank angle from an arbitrary constant crank angle to another arbitrary constant crank angle may be used to determine whether or not knocking has occurred. In this case, the interval of crank angle for which the integrated magnitude is calculated is the interval of the knock detection gate, namely 90° or smaller.

Figure 18:
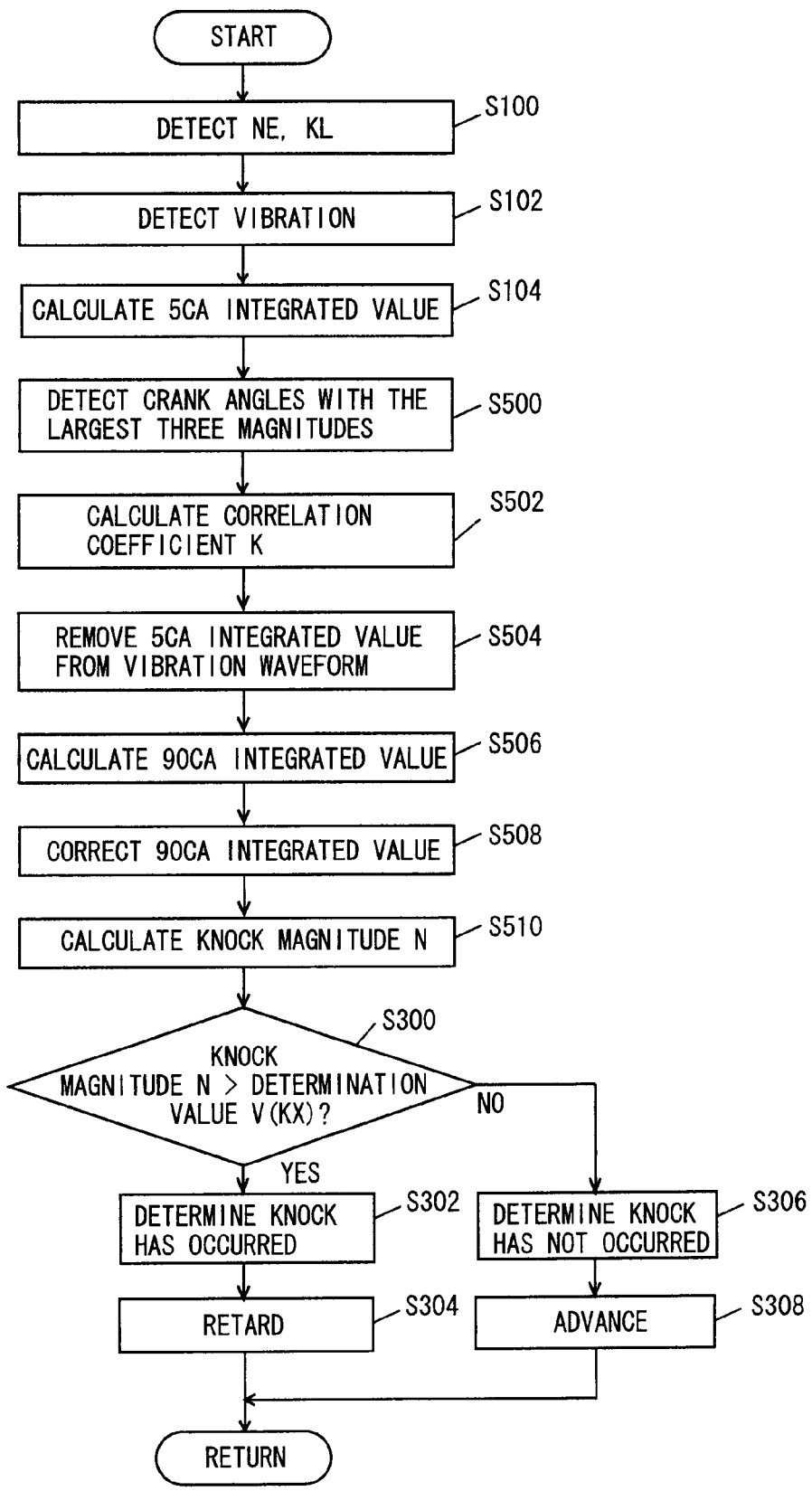
FIG. 18 is a (first) flowchart showing a control structure of a program executed by an engine ECU that is a knocking determination device according to the second embodiment of the present invention.

Referring to FIG. 18, a description will be given of a control structure of a program executed by the engine ECU, which is the knocking determination device of the present embodiment, to determine, each time the ignition occurs, whether or not knocking has occurred.

The process steps S100 to S104 and S300 to S308 are identical to those in the first embodiment. Therefore, the detailed description thereof will not be repeated.

In S500, engine ECU 200 detects three crank angles at which respective 5CA integrated values are the largest three among 5CA integrated values each larger than respective 5CA integrated values at adjacent crank angles in the vibration waveform of engine 100.

In S502, engine ECU 200 compares, with the knock waveform model, the vibration waveform in the region starting from the crank angle at which the 5CA integrated value is larger than respective 5CA integrated values at adjacent crank angles, and calculate correlation coefficient K for each region.

In S504, engine ECU 200 removes from the vibration waveform the magnitudes in a range of crank angle of 10° from the leftmost crank angle in a region of the vibration waveform where correlation coefficient K is smaller than threshold value K(0). Here, the magnitudes in the range of crank angle other than 10° may be removed from the vibration waveform. Further, the magnitudes at crank angles from any crank angle other than the leftmost crank angle in the region where correlation coefficient K is smaller than threshold value K(0) in the vibration waveform may be removed. If no correlation coefficient K is smaller than threshold value K(0), this process step is not performed.

In S506, engine ECU 200 calculates the 90CA integrated value by integrating the magnitudes in the range of crank angle from the top dead center to 90°.

In S508, engine ECU 200 corrects the 90CA integrated value to compensate for the magnitudes removed from the vibration waveform. Namely, the 90CA integrated value is corrected to be increased.

Figure 20:
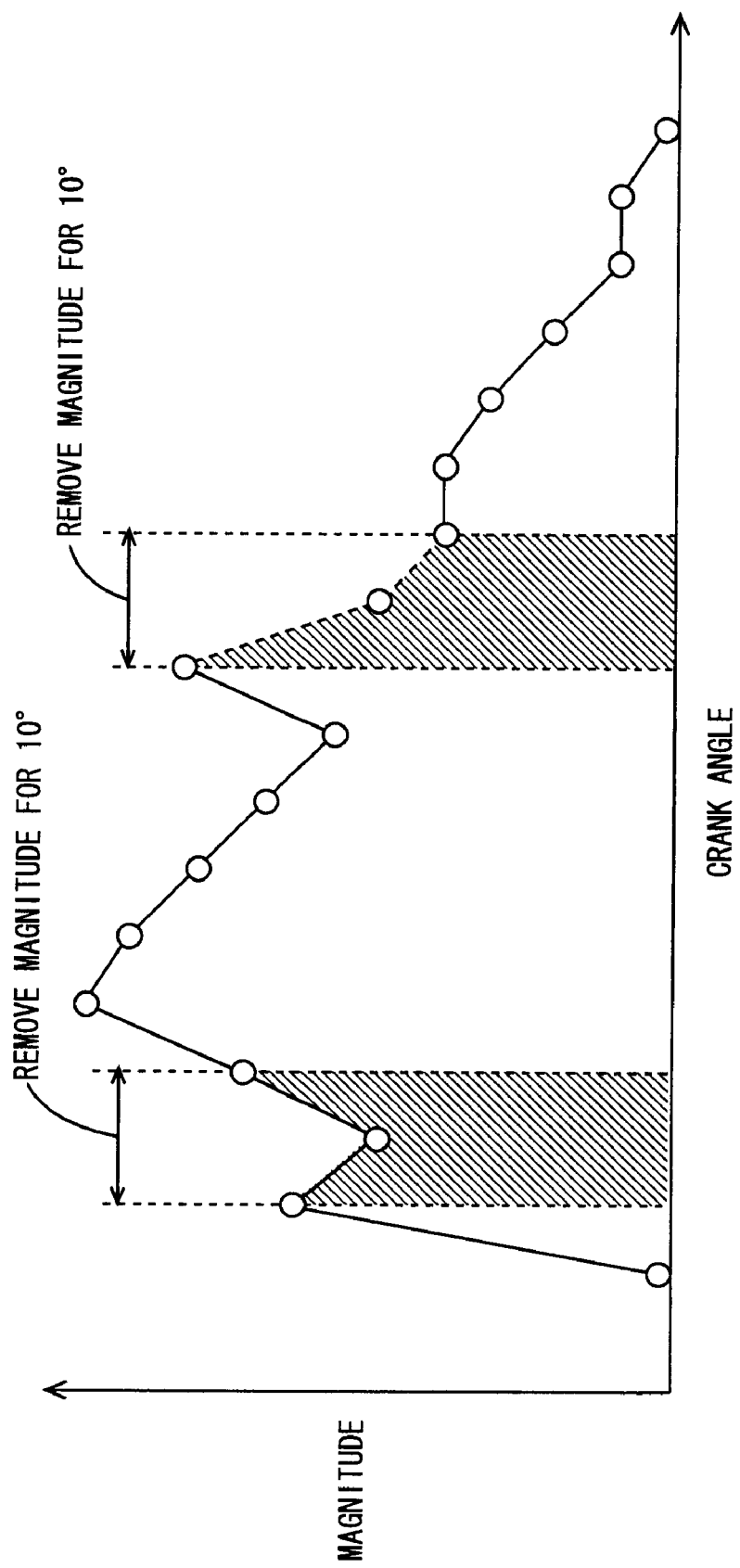
Figure 21:
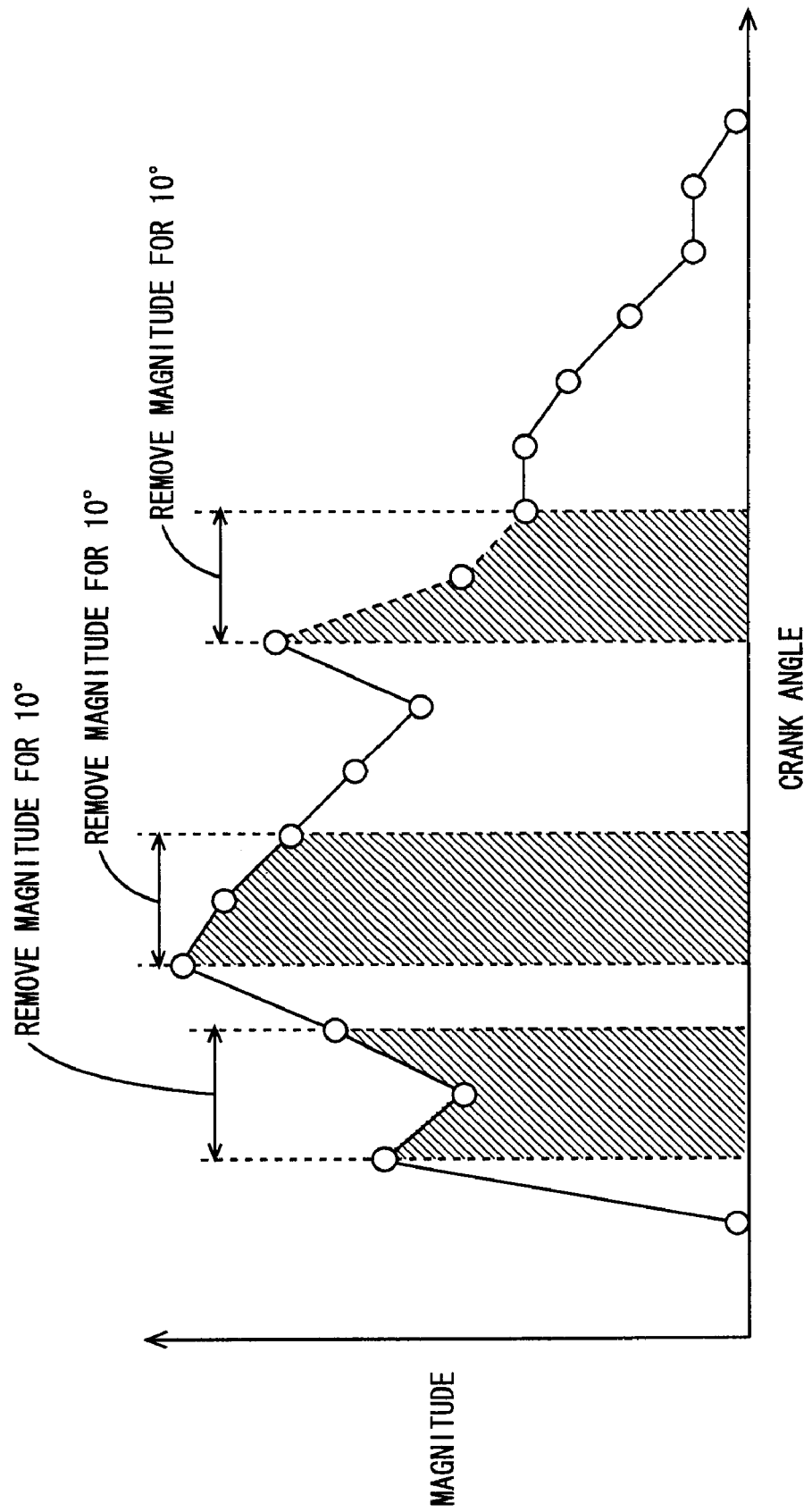

For example, in the case where only one correlation coefficient K is smaller than threshold value K(0) and the magnitudes in the range of crank angle of 10° are removed from the vibration waveform as shown in FIG. 19, the 90CA integrated value is multiplied by 18/16. In the case where two correlation coefficients K are smaller than threshold value K(0) and the magnitudes in the range of crank angle of 20° in total are removed from the vibration waveform as shown in FIG. 20, the 90CA integrated value is multiplied by 18/12. In the case where three correlation coefficients K are smaller than threshold value K(0) and the magnitudes in the range of crank angle of 30° in total are removed from the vibration waveform as shown in FIG. 21, the 90CA integrated value is multiplied by 18/12.

Referring back to FIG. 18, in S510, engine ECU 200 divides the 90CA integrated value by BGL to calculate knock magnitude N.

Figure 22:
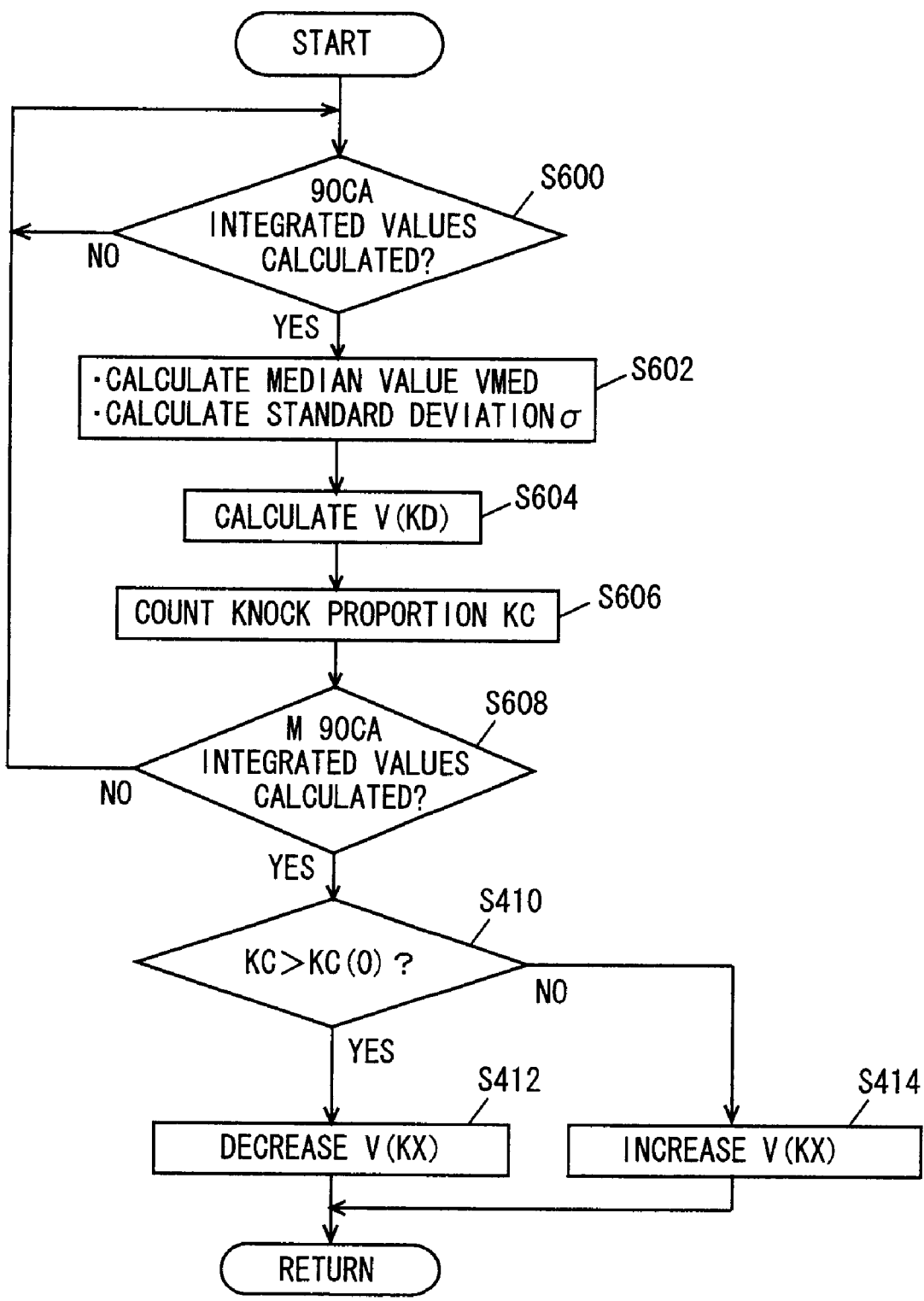
FIG. 22 is a (second) flowchart showing a control structure of a program executed by the engine ECU that is the knocking determination device according to the second embodiment of the present invention.

Referring to FIG. 22, a description will be given of a control structure of a program executed by engine ECU 200, which is the knocking determination device of the present embodiment, to correct determination value V(KX). The process steps from S410 to S414 are identical to those in the first embodiment and therefore, the detailed description thereof will not be repeated here.

In S600, engine ECU 200 determines whether or not 90CA integrated values have been calculated. When the 90CA integrated values have been calculated (YES in S600), the process proceeds to S602. Otherwise (NO in S600), the process returns to S600.

In S602, engine ECU 200 calculates median value VMED and standard deviation σ of the calculated 90CA integrated values. The calculation of median value VMED and standard deviation σ may be performed each time M 90CA integrated values have been calculated.

In S604, engine ECU 200 calculates knock determination level V(KD) based on median value VMED and standard deviation σ.

In S606, engine ECU 200 counts the number of 90CA integrated values larger than knock determination level V(KD) among the calculated 90CA integrated values to determine the proportion of the counted integrated values as knock proportion KC.

In S608, engine ECU 200 determines whether or not M 90CA integrated values (90CA integrated values in M cycles) have been calculated since the last correction of determination value V(KX). When M 90CA integrated values have been calculated since the last correction of determination value V(KX) (YES in S608), the process proceeds to S410. Otherwise (NO in S608), the process returns to S600.

A description will be given of an operation of engine ECU 200, which is the knocking determination device of the present embodiment, based on the above-described configuration and flowchart.

Similarly to the first embodiment, the vibration waveform of engine 100 is detected, and then three crank angles are detected at which respective 5CA integrated values are the largest three among 5CA integrated values each larger than respective 5CA integrated values at adjacent crank angles (S500). The vibration waveform in the regions starting from the detected crank angles respectively is compared with the knock waveform model to calculate correlation coefficient K for each region (S502).

Any region for which this correlation coefficient K is smaller than threshold value K(0) is regarded as the one representing vibration due to the noise component. Therefore, in the region for which correlation coefficient K is smaller than threshold value K(0), the magnitudes for the range of crank angle of 10° from the leftmost crank angle are removed from the vibration waveform (S504).

For this vibration waveform, the 90CA integrated value is determined by integrating magnitudes in the range of crank angle from the top dead center to 90° (S506). Further, to compensate for the magnitudes removed from the vibration waveform, the 90CA integrated value is corrected (S508). The 90CA integrated value is divided by BGL to calculate knock magnitude N (S510).

Like the first embodiment, when knock magnitude N is larger than determination value V(KX) (YES in S300), it is determined that knocking has occurred (S302), and the ignition timing is retarded (S304). When knock magnitude N is smaller than determination value V(KX) (NO in S300), it is determined that knocking has not occurred (S306), and the ignition timing is advanced (S308).

The 90CA integrated value which is determined by integrating magnitudes at crank angles from the top dead center to 90° is used, and thus the integrated value of the magnitudes at crank angles in the same range can always be obtained. Therefore, under substantially the same condition, the final determination can be made as to whether or not knocking has occurred. Thus, whether or not knocking has occurred can be determined precisely.

In the present embodiment, the frequency distribution of 90CA integrated values is used to correct determination value V(KX). When 90CA integrated values have been calculated (YES in S600), median value VMED and standard deviation σ of the calculated 90CA integrated values are calculated (S602). Based on these median value VMED and standard deviation σ, knock determination level V(KD) is calculated (S604).

The number of 90CA integrated values larger than determination level V(KD) are counted to determine the proportion thereof as knock proportion KC (S606). When M 90CA integrated values have been calculated since the last correction of determination value V(KX) (YES in S608) and if knock proportion KC is larger than threshold value KC(0) (YES in S410), determination value V(KX) is decreased (S412). Thus, it is more likely to be determined that knocking has occurred. Therefore, the frequency at which the ignition timing is retarded can be made higher.

If knock proportion KC is smaller than threshold value KC(0) (NO in S410), determination value V(KX) is increased (S414). Thus, it is more likely to be determined that knocking has not occurred. Therefore, the frequency at which the ignition timing is advanced can be made higher.

As described above, regarding the engine ECU which is the knock determination device of the present embodiment, the vibration waveform and the knock waveform model are compared with each other and, as a result, if any region does not satisfy the condition that there is a possibility of occurrence of knocking, the magnitude in this region is corrected. The 90CA integrated value is calculated by integrating the magnitudes of the corrected waveform in the range of crank angle from the top dead center to 90°. Thus, the 90CA integrated value can be obtained that is considerably different depending on whether the integrated value is calculated from magnitudes of vibration due to knocking or the integrated value is calculated from magnitudes of vibration due to noise component. Therefore, knock magnitude N calculated from vibration due to knocking can be made larger than knock magnitude N calculated from vibration due to noise component. Accordingly, knock magnitude N can be compared with determination value V(KX) to precisely determine whether or not knocking has occurred.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for determining knocking of an internal combustion engine, comprising:
   a crank position sensor detecting a crank angle of said internal combustion engine;
   a knock sensor detecting a magnitude of vibration of said internal combustion engine in association with the crank angle; and
   an operation unit, wherein
   said operation unit detects a waveform of vibration in a first interval from a first crank angle to a second crank angle, based on the magnitude of vibration of said internal combustion engine,
   said operation unit determines whether or not a predetermined condition is satisfied, based on a result of comparison between said detected waveform and a waveform model predetermined for use as a reference waveform of vibration in a second interval of at most said first interval,
   said operation unit calculates an integrated value by integrating magnitudes that are included in said detected waveform and that are in a third interval of at most said first interval, based on whether or not said condition is satisfied, and
   said operation unit determines whether or not knocking has occurred in said internal combustion engine, based on said integrated value.

2. The device according to claim 1, wherein
said operation unit calculates said integrated value when it is determined that said condition is satisfied.

3. The device according to claim 1, wherein
said second interval is smaller than said first interval,
said operation unit determines whether or not said condition is satisfied for each of regions respectively from a predetermined number of selected crank angles at which magnitudes are largest among magnitudes each larger than respective magnitudes at adjacent crank angles, based on the result of comparison between said detected waveform and said waveform model,
when it is determined that any of said regions does not satisfy said condition, the operation unit corrects said detected waveform so that the magnitude at any crank angle in the region that does not satisfy said condition as determined is reduced, and calculates said integrated value, and
said operation unit corrects said integrated value to increase said integrated value.

4. The device according to claim 3, wherein
said operation unit determines whether or not knocking has occurred in said internal combustion engine, based on the integrated value determined by integrating magnitudes in said third interval that are at crank angles including any crank angle in any of the regions that satisfies said condition as determined.

5. The device according to claim 1, wherein
said operation unit determines whether or not knocking has occurred in said internal combustion engine, based on the integrated value determined by integrating magnitudes in said third interval from a third crank angle to a fourth crank angle.

6. The device according to claim 5, wherein
said first crank angle and said third crank angle are the same crank angle, and
said second crank angle and said fourth crank angle are the same crank angle.

7. The device according to claim 1, wherein
said second interval and said third interval are the same interval.

8. The device according to claim 1, wherein
said condition is a condition that there is a possibility of occurrence of knocking.

9. The device according to claim 1, wherein
said operation unit determines whether or not knocking has occurred in said internal combustion engine by comparing said integrated value with a predetermined determination value, and
said operation unit corrects said determination value based on a plurality of said integrated values.

10. The device according to claim 9, wherein
said operation unit calculates a frequency of occurrence of knocking based on a plurality of said integrated values, and
said operation unit corrects said determination value based on the frequency of occurrence of knocking.

11. A method for determining knocking of an internal combustion engine, comprising the steps of:
   detecting a crank angle of said internal combustion engine;
   detecting a magnitude of vibration of said internal combustion engine in association with the crank angle;
   detecting a waveform of vibration in a first interval from a first crank angle to a second crank angle, based on the magnitude of vibration of said internal combustion engine;
   determining whether or not a predetermined condition is satisfied, based on a result of comparison between said detected waveform and a waveform model predetermined for use as a reference waveform of vibration in a second interval of at most said first interval;

calculating an integrated value by integrating magnitudes that are included in said detected waveform and that are in a third interval of at most said first interval, based on whether or not said condition is satisfied; and determining whether or not knocking has occurred in said internal combustion engine, based on said integrated value.

12. The method according to claim 11, wherein
the step of calculating said integrated value includes the step of calculating said integrated value when it is determined that said condition is satisfied.

13. The method according to claim 11, wherein
said second interval is smaller than said first interval,
the step of determining whether or not said condition is satisfied includes the step of determining whether or not said condition is satisfied for each of regions respectively from a predetermined number of selected crank angles at which magnitudes are largest among magnitudes each larger than respective magnitudes at adjacent crank angles, based on the result of comparison between said detected waveform and said waveform model,
the step of calculating said integrated value includes the step of correcting, when it is determined that any of said regions does not satisfy said condition, said detected waveform so that the magnitude at any crank angle in the region that does not satisfy said condition as determined is reduced, and calculating said integrated value, and
said method for determining knocking further comprises the step of correcting said integrated value to increase said integrated value.

14. The method according to claim 13, wherein
the step of determining whether or not knocking has occurred includes the step of determining whether or not knocking has occurred in said internal combustion engine, based on the integrated value determined by integrating magnitudes in said third interval that are at crank angles including any crank angle in any of the regions that satisfies said condition as determined.

15. The method according to claim 11, wherein
the step of determining whether or not knocking has occurred includes the step of determining whether or not knocking has occurred in said internal combustion engine, based on the integrated value determined by integrating magnitudes in said third interval from a third crank angle to a fourth crank angle.

16. The method according to claim 15, wherein
said first crank angle and said third crank angle are the same crank angle, and
said second crank angle and said fourth crank angle are the same crank angle.

17. The method according to claim 11, wherein
said second interval and said third interval are the same interval.

18. The method according to claim 11, wherein
said condition is a condition that there is a possibility of occurrence of knocking.

19. The method according to claim 11, wherein
the step of determining whether or not knocking has occurred includes the step of determining whether or not knocking has occurred in said internal combustion engine by comparing said integrated value with a predetermined determination value, and
said method for determining knocking further comprises the step of correcting said determination value based on a plurality of said integrated values.

20. The method according to claim 19, wherein
said method for determining knocking further comprises the step of calculating a frequency of occurrence of knocking based on a plurality of said integrated values, and
the step of correcting said determination value includes the step of correcting said determination value based on the frequency of occurrence of knocking.

21. A device for determining knocking of an internal combustion engine, comprising:
means for detecting a crank angle of said internal combustion engine;
means for detecting a magnitude of vibration of said internal combustion engine in association with the crank angle;
means for detecting a waveform of vibration in a first interval from a first crank angle to a second crank angle, based on the magnitude of vibration of said internal combustion engine;
first determination means for determining whether or not a predetermined condition is satisfied, based on a result of comparison between said detected waveform and a waveform model predetermined for use as a reference waveform of vibration in a second interval of at most said first interval;
means for calculating an integrated value by integrating magnitudes that are included in said detected waveform and that are in a third interval of at most said first interval, based on the determination by said first determination means; and
second determination means for determining whether or not knocking has occurred in said internal combustion engine, based on said integrated value.

22. The device according to claim 21, wherein
said means for calculating includes means for calculating said integrated value when it is determined that said condition is satisfied.

23. The device according to claim 21, wherein
said second interval is smaller than said first interval,
said first determination means includes means for determining whether or not said condition is satisfied for each of regions respectively from a predetermined number of selected crank angles at which magnitudes are largest among magnitudes each larger than respective magnitudes at adjacent crank angles, based on the result of comparison between said detected waveform and said waveform model,
said means for calculating includes means for correcting, when it is determined that any of said regions does not satisfy said condition, said detected waveform so that the magnitude at any crank angle in the region that does not satisfy said condition as determined is reduced, and calculating said integrated value, and
said device for determining knocking further comprises means for correcting said integrated value to increase said integrated value.

24. The device according to claim 23, wherein
said second determination means includes means for determining whether or not knocking has occurred in said internal combustion engine, based on the integrated value determined by integrating magnitudes in said third interval that are at crank angles including any crank angle in any of the regions that satisfies said condition as determined.

25. The device according to claim 21, wherein
said second determination means includes means for determining whether or not knocking has occurred in said internal combustion engine, based on the integrated value determined by integrating magnitudes in said third interval from a third crank angle to a fourth crank angle.

26. The device according to claim 25, wherein
said first crank angle and said third crank angle are the same crank angle, and
said second crank angle and said fourth crank angle are the same crank angle.

27. The device according to claim 21, wherein
said second interval and said third interval are the same interval.

28. The device according to claim 21, wherein
said condition is a condition that there is a possibility of occurrence of knocking.

29. The device according to claim 21, wherein
said second determination means includes means for determining whether or not knocking has occurred in said internal combustion engine by comparing said integrated value with a predetermined determination value, and
said device for determining knocking further comprises means for correcting said determination value based on a plurality of said integrated values.

30. The device according to claim 29, wherein
said device for determining knocking further comprises means for calculating a frequency of occurrence of knocking based on a plurality of said integrated values, and
said means for correcting includes means for correcting said determination value based on the frequency of occurrence of knocking.

* * * * *